US012053894B2

(12) United States Patent
Yuan et al.

(10) Patent No.: US 12,053,894 B2
(45) Date of Patent: Aug. 6, 2024

(54) COORDINATING AGRICULTURAL ROBOTS

(71) Applicant: Mineral Earth Sciences LLC, Mountain View, CA (US)

(72) Inventors: Zhiqiang Yuan, San Jose, CA (US); Elliott Grant, Woodside, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 332 days.

(21) Appl. No.: 17/683,696

(22) Filed: Mar. 1, 2022

(65) Prior Publication Data

US 2022/0219329 A1 Jul. 14, 2022

Related U.S. Application Data

(63) Continuation of application No. 16/545,441, filed on Aug. 20, 2019, now Pat. No. 11,285,612.

(51) Int. Cl.
*B25J 9/16* (2006.01)
*A01B 79/00* (2006.01)
(Continued)

(52) U.S. Cl.
CPC .......... *B25J 9/1697* (2013.01); *A01B 79/005* (2013.01); *B25J 11/008* (2013.01); *G05D 1/0061* (2013.01)

(58) Field of Classification Search
USPC ................................. 700/245–264
See application file for complete search history.

(56) References Cited

U.S. PATENT DOCUMENTS 4,015,366 A * 4/1977 Hall, III .................. A01G 3/04
193/25 E
RE31,023 E * 9/1982 Hall, III .................. A01G 7/00
193/25 E
(Continued)

FOREIGN PATENT DOCUMENTS

| WO | 2007109627 | 9/2007 |
| WO | 2015064780 | 5/2015 |
| WO | 2017002093 | 1/2017 |

OTHER PUBLICATIONS

Dorrier, J.; "Robots Able to Pick Peppers, Test Soil, and Prune Plants Aim to Replace Farm Workers"; Singularity Hub; https://singularityhub.com/2014/07/14/pepper-picking-soil-testing-plant-pruning-robots-are-coming-to-farms/; 4 pages; Jul. 14, 2014.
(Continued)

*Primary Examiner* — Jonathan L Sample
(74) *Attorney, Agent, or Firm* — Gray Ice Higdon

(57) ABSTRACT

Implementations are described herein for coordinating semi-autonomous robots to perform agricultural tasks on a plurality of plants with minimal human intervention. In various implementations, a plurality of robots may be deployed to perform a respective plurality of agricultural tasks. Each agricultural task may be associated with a respective plant of a plurality of plants, and each plant may have been previously designated as a target for one of the agricultural tasks. It may be determined that a given robot has reached an individual plant associated with the respective agricultural task that was assigned to the given robot. Based at least in part on that determination, a manual control interface may be provided at output component(s) of a computing device in network communication with the given robot. The manual control interface may be operable to manually control the given robot to perform the respective agricultural task.

20 Claims, 13 Drawing Sheets

(51) Int. Cl.
  *B25J 11/00*  (2006.01)
  *G05D 1/00*  (2006.01)

(56) References Cited

U.S. PATENT DOCUMENTS

| | | | | |
|---|---|---|---|---|
| 4,532,757 A * | 8/1985 | Tutle | A01D 46/24 | 382/110 |
| 4,663,925 A * | 5/1987 | Terada | B25J 5/007 | 414/730 |
| 5,442,552 A | 8/1995 | Slaughter et al. | | |
| 5,987,862 A * | 11/1999 | Long | A01G 3/08 | 56/16.8 |
| 6,442,920 B1 * | 9/2002 | Peterson | A01D 46/26 | 56/328.1 |
| 6,445,983 B1 * | 9/2002 | Dickson | G05D 1/027 | 701/472 |
| 6,671,582 B1 * | 12/2003 | Hanley | B25J 9/162 | 47/1.01 R |
| 6,756,789 B1 * | 6/2004 | Parker | A01G 23/00 | 324/637 |
| 7,096,090 B1 * | 8/2006 | Zweig | G05D 1/0022 | 700/249 |
| 7,765,780 B2 * | 8/2010 | Koselka | A01D 46/30 | 701/50 |
| 8,150,554 B2 * | 4/2012 | Anderson | G06Q 50/06 | 701/50 |
| 8,321,365 B2 * | 11/2012 | Anderson | G06Q 50/02 | 706/46 |
| 9,226,446 B2 * | 1/2016 | Moore | A01D 46/30 | |
| 9,357,708 B2 * | 6/2016 | Chang | B25J 18/06 | |
| 9,382,003 B2 * | 7/2016 | Burema | A01B 79/02 | |
| 9,532,508 B1 * | 1/2017 | Stubbs | A01D 91/04 | |
| 10,185,317 B2 * | 1/2019 | Pichlmaier | G05D 1/0027 | |
| 10,255,670 B1 * | 4/2019 | Wu | H04N 7/183 | |
| 2003/0070409 A1 * | 4/2003 | Adams | A01D 46/005 | 56/328.1 |
| 2004/0049473 A1 * | 3/2004 | Gower | G06Q 10/06 | 707/999.1 |
| 2004/0200146 A1 * | 10/2004 | Leyns | A01G 9/143 | 47/65 |
| 2005/0126144 A1 * | 6/2005 | Koselka | A01D 46/30 | 56/10.2 R |
| 2006/0213167 A1 * | 9/2006 | Koselka | A01D 75/00 | 56/10.2 A |
| 2007/0061041 A1 * | 3/2007 | Zweig | G05D 1/0261 | 700/245 |
| 2007/0135962 A1 * | 6/2007 | Kawabe | G10L 13/00 | 704/E15.045 |
| 2008/0253613 A1 * | 10/2008 | Jones | G06V 40/20 | 704/E15.001 |
| 2009/0231101 A1 * | 9/2009 | Hyde | A01G 9/006 | 340/10.1 |
| 2010/0268562 A1 * | 10/2010 | Anderson | G06Q 10/06313 | 705/7.25 |
| 2010/0268679 A1 * | 10/2010 | Anderson | G06N 5/02 | 706/46 |
| 2011/0047951 A1 * | 3/2011 | Moore | A01D 46/24 | 56/328.1 |
| 2012/0152877 A1 * | 6/2012 | Tadayon | F24S 40/90 | 901/30 |
| 2013/0021157 A1 * | 1/2013 | Teeter | G09F 21/04 | 29/446 |
| 2013/0340682 A1 * | 12/2013 | Bareket | A01J 5/017 | 119/14.08 |
| 2013/0345876 A1 * | 12/2013 | Rudakevych | B25J 9/104 | 700/259 |
| 2014/0044237 A1 * | 2/2014 | Ferrer | B25J 7/00 | 414/815 |
| 2014/0110021 A1 | 4/2014 | Divine | | |
| 2014/0168412 A1 * | 6/2014 | Shulman | G06V 20/20 | 348/89 |
| 2014/0303814 A1 * | 10/2014 | Burema | B64U 50/39 | 901/1 |
| 2014/0314280 A1 * | 10/2014 | Lee | G01N 33/0098 | 382/110 |
| 2015/0015697 A1 * | 1/2015 | Redden | G01B 11/24 | 382/110 |
| 2015/0027044 A1 * | 1/2015 | Redden | A01G 7/06 | 47/58.1 R |
| 2015/0186387 A1 * | 7/2015 | Funabashi | G06F 16/24578 | 707/723 |
| 2015/0237790 A1 * | 8/2015 | Redden | G01C 11/00 | 701/50 |
| 2015/0283701 A1 * | 10/2015 | Izhikevich | G05D 1/0088 | 700/250 |
| 2015/0283702 A1 * | 10/2015 | Izhikevich | B25J 9/163 | 700/257 |
| 2016/0050852 A1 * | 2/2016 | Lee | B25J 9/023 | 901/41 |
| 2016/0073584 A1 * | 3/2016 | Davidson | A01D 46/30 | 294/198 |
| 2016/0120124 A1 * | 5/2016 | De Kleine | A01D 46/264 | 56/329 |
| 2016/0193729 A1 * | 7/2016 | Williams | G01C 21/3856 | 901/1 |
| 2016/0243696 A1 * | 8/2016 | Kahani | B25J 9/023 | |
| 2017/0206532 A1 * | 7/2017 | Choi | G06Q 30/02 | |
| 2017/0357400 A1 * | 12/2017 | Foster | G05D 1/0016 | |
| 2018/0092304 A1 * | 4/2018 | Moore | A01D 46/24 | |
| 2018/0146618 A1 * | 5/2018 | Elazary | A01D 46/30 | |
| 2019/0208705 A1 * | 7/2019 | Pippi | A01D 46/264 | |
| 2019/0261566 A1 * | 8/2019 | Robertson | A01D 46/30 | |
| 2020/0029488 A1 * | 1/2020 | Bertucci | A01B 79/005 | |
| 2020/0198122 A1 * | 6/2020 | Newman | B25J 13/006 | |
| 2021/0045379 A1 * | 2/2021 | Grant | A01M 21/043 | |

OTHER PUBLICATIONS

Visser, R.; "Next Generation Timber Harvesting Systems: Opportunities for Remote-Controlled and Autonomous Machinery"; 26 pages; Dec. 4, 2017.
Precision Agriculture; "Autonomous Robots for Large-Scale Agriculture"; https://precisionagriculture/autonomous-robots-for-large-scale-agriculture/; 6 pages; Oct. 13, 2014.
Caltrans Division of Research, Innovation and System Information; "Using Remote Control Mowers for Roadside Vegetation Control"; 26 pages; Dec. 9, 2016.
Lehnert, R.; "Automated Pruning With Robotics"; Good Fruit Grower; https://www.goodfruit.com/automated-pruning-with-robotics; 8 pages; Apr. 13, 2015.
Tomlinson, C.; "Plus One Robotics Teaches Robots How to Take Over the Drudgery of Warehouse Work"; Houston Chronicle; https://houstonchronicle.com/business/columnists/tomlinson/article/Plus-One-Robotics-teaches-robots-how-to-take-over-13868808.php; 4 pages; May 22, 2019.

* cited by examiner

COORDINATING AGRICULTURAL ROBOTS

BACKGROUND

Many agricultural tasks require measures of dexterity and/or delicacy that are difficult for autonomous robots to achieve. For example, it may be desired, without harming a plant, to trim the plant, to pick weeds that may have become entangled with the plant, or to pick fruit from the plant. Every plant is unique, which means performance of these tasks will vary extensively between individual plants. Robots are better-suited to autonomously perform tasks that are relatively uniform in nature.

SUMMARY

Implementations disclosed herein are directed to coordinating semi-autonomous robots to perform agricultural tasks on a plurality of plants with minimal human intervention. These techniques delegate as much of the work as possible to the robots, with a human operator intervening only if and/or when the robot is incapable of safely performing a specific agricultural task with a threshold amount of confidence. Techniques described herein allow for a relatively small number of human operators (e.g., as few as one) to control a comparatively large fleet of robots because, e.g., a human operator may manually control a robot only when the robot reaches a point at which it cannot proceed without posing an unacceptable risk to a plant.

In some implementations, a method performed by one or more processors is provided that includes: deploying a plurality of robots to perform a respective plurality of agricultural tasks, wherein each agricultural task of the plurality of agricultural tasks is associated with a respective plant of a plurality of plants, wherein each plant of the plurality of plants was previously designated as a target for one of the agricultural tasks; determining that a given robot of the plurality of robots has reached the individual plant associated with the respective agricultural task of the plurality of agricultural tasks that was assigned to the given robot; based at least in part on the determining, providing, at one or more output components of a computing device in network communication with the given robot, a manual control interface that is operable to manually control the given robot to perform the respective agricultural task; receiving user input at the manual control interface; and operating the given robot in accordance with the user input received at the manual control interface.

In various implementations, the method may further include rendering a plurality of selectable elements associated with the plurality of agricultural tasks. In various implementations, each selectable element of the plurality of selectable elements may be operable to render additional information about the respective agricultural task. In various implementations, the additional information may include vision data depicting the plant associated with the respective agricultural task. In various implementations, the additional information may further include one or more annotations overlaying the vision data, wherein the one or more annotations visually emphasize one or more portions of the plant that are to be acted upon by the given robot.

In various implementations, the method may further include: providing output in association with one of the robots, wherein the output prompts a user to either: manually control the robot to perform the agricultural task assigned to the robot; or predefine a robot plan for the robot to follow to perform the agricultural task automatically. In various implementations, the method may further include deploying one or more scout robots to travel among the plurality of plants and capture sensor data, wherein the sensor data is analyzed to designate each of the plurality of plants as a target for one of the plurality of agricultural tasks. In various implementations, the one or more scout robots may be separate from the plurality of robots.

In various implementations, the plurality of agricultural tasks may include one or more of picking a weed from nearby a plant, applying a chemical to a plant, picking one or more fruits from a plant, or trimming a plant.

In another related aspect, a method implemented using one or more processors may include: deploying one or more robots to travel among a plurality of plants and acquire vision data of the plants; analyzing the vision data to designate each of the plurality of plants as a target for performance of an agricultural task; deploying a plurality of robots among the plurality of plants to perform the plurality of agricultural tasks; and based at least in part on a given robot of the plurality of robots arriving at the plant that is the target of the agricultural task assigned to the given robot, causing a manual control graphical user interface ("GUI") to be rendered, wherein the manual control GUI is operable by a human operator to manually control the given robot to perform the agricultural task assigned to the given robot.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
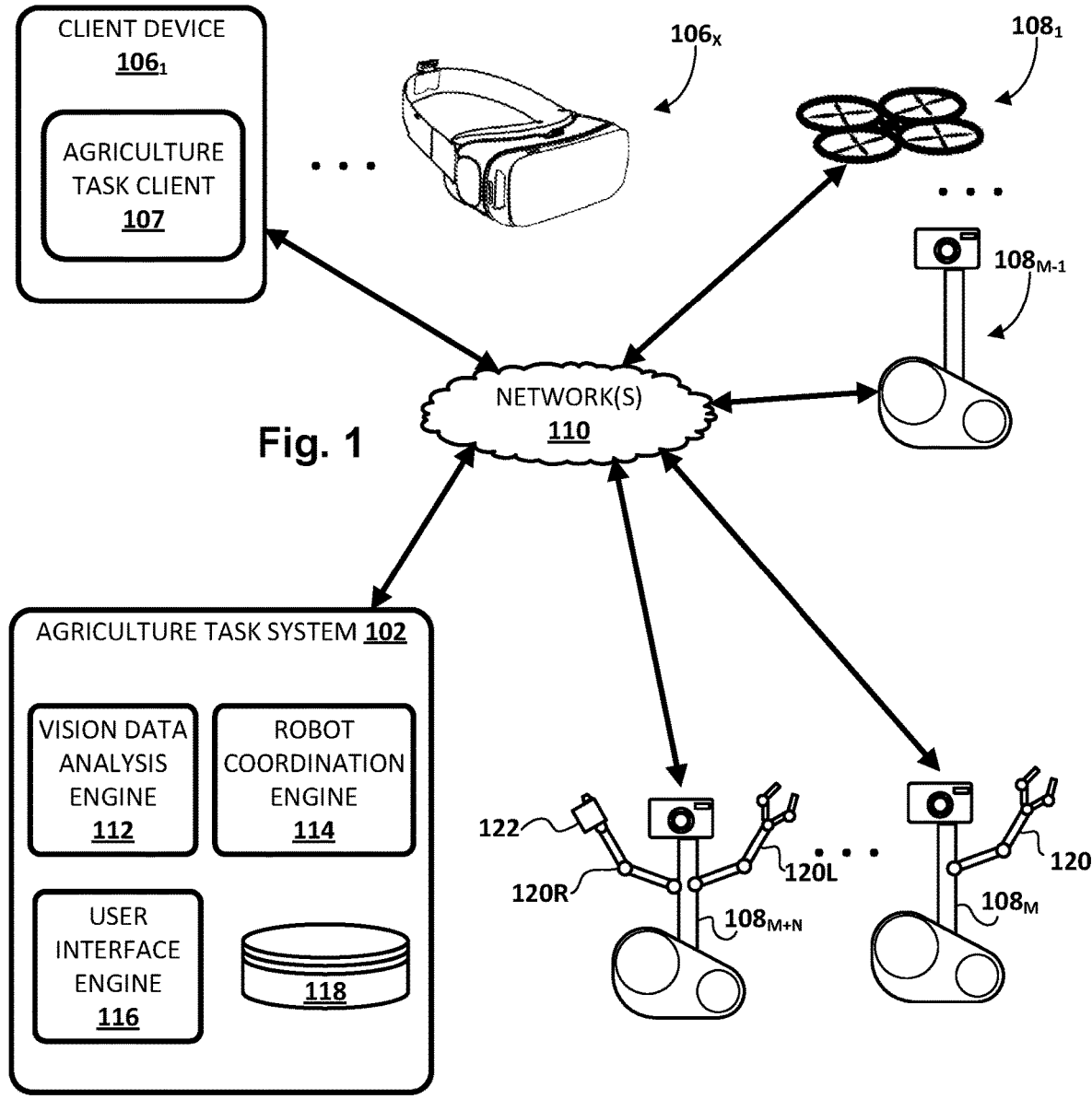
FIG. 1 schematically depicts an example environment in which disclosed techniques may be employed in accordance with various implementations.

Techniques are described herein for coordinating semi-autonomous robots to perform agricultural tasks on a plurality of plants with minimal human intervention. These techniques delegate as much of the work as possible to the robots, with a human operator intervening only if and/or when the robot is incapable of safely performing a specific agricultural task with a threshold amount of confidence. Techniques described herein allow for a relatively small number of human operators (e.g., as few as one) to control a comparatively large fleet of robots because, e.g., a human operator may manually control a robot only when the robot reaches a point at which it cannot proceed without posing an unacceptable risk to a plant.

Agricultural tasks such as pruning, picking, weeding, applying chemicals, deploying beneficial bugs, thinning, seeding, or pollinating etc., may be identified manually, e.g., by farm workers, or automatically based on data gathered by robots (in a process that is referred to herein as "scouting"). In some implementations, one or more "scout" robots equipped with various types of sensors, such as two-dimensional ("2D") or three-dimensional ("3D") vision sensors, may be deployed to a field to acquire vision data of plants. This vision data may be analyzed, e.g., by the scout robots themselves or remotely at one or more computing systems (e.g., one or more computing systems that collectively form what is often referred to as the "cloud"), to identify agricultural tasks for one or more of the plants. For example, one subset of plants may be identified as ready to harvest, another subset of plants may be identified as in need of pruning, another subset may be identified as being infested by weeds or pests, and so forth (the subsets may or may not be disjoint). The individual plants of these subsets may be flagged for performance of appropriate agricultural tasks. In some implementations, a scout robot may gather sufficient data to identify specific plant parts that need intervention. As will be discussed below, these plant parts may be annotated later to aid a human operator in causing a robot to perform the agricultural task.

Later, the same robot(s) and/or a different plurality of robots (e.g., distinct "worker" robots) may be deployed to the field. Each worker robot may be assigned to perform a particular agricultural task on a particular plant. Traveling to plants is a relatively easy operation for a robot to perform autonomously, and so the robots may travel to their respective plants with little-to-no human intervention. Once a given robot arrives at its respective plant, however, it may transition from an autonomous mode to a manual mode. A human operator may then be provided a manual control graphical user interface ("GUI") that is operable by the human operator to control the robot manually while the robot is in manual mode. Once the human manually controls the robot to complete the agricultural operation, the robot may transition back into an autonomous mode and may either move on to another plant to perform another agricultural task, or may return to base.

In some implementations a queue of agricultural tasks may be output for interaction by human operators. This queue (or more generally, list) of agricultural tasks may include all of the agricultural tasks described previously, or only some of those agricultural tasks. For example, in some implementations, when a robot autonomously arrives at its destination plant and transitions into the manual mode, a new agricultural task may be added to the queue. In some implementations, human operator(s) may commandeer the robots to perform the agricultural tasks in the order the agricultural tasks appear in the queue. Additionally or alternatively, in some implementations, human operator(s) may select whichever agricultural task they want, regardless of its order in the queue.

While some agricultural tasks are difficult for a robot to perform autonomously without posing unacceptable risk to the plant, that is not necessarily the case for all robot tasks. For example, some agricultural tasks, such as spraying pesticide or applying fertilizer, may be relatively inexact, and therefore may be performed relatively safely by an autonomous robot, with little or no fear of harming the plant. Accordingly, in some implementations, an agricultural task to be performed by each robot may be assigned what will be referred to herein as a "robot performability score" or a "measure of robot performability." A robot performability score/measure of robot performability represents a likelihood that the robot will be able to perform the task autonomously without harming the plant (or itself, or another robot, or a human).

In some such implementations, agricultural tasks may be presented to the human operator in a manner that is selected based on the respective robot performability scores. For example, a human operator may be presented with a plurality of selectable elements, each corresponding to an agricultural task to be performed by a respective robot. These selectable elements may or may not be arranged in a queue as described previously. In some implementations, selectable elements may be presented only for those agricultural tasks with robot performability scores that fail to satisfy some threshold (i.e., the agricultural tasks are too difficult or risky for the robot to perform autonomously). Other agricultural tasks that are less difficult for a robot to perform autonomously may proceed without human intervention. In other implementations, selectable elements may be presented for all agricultural tasks, but they may be ranked, visually emphasized, color-coded, or otherwise organized in accordance with their respective robot performability scores.

It may not be necessary in all cases for a human to manually control a robot synchronously, or in real time. In some implementations, a human operator may instead predefine manual robot operations, or a "robot plan," prior to the robot arriving at its destination. The robot plan may include parameters such as one or more robot arm trajectories to be traversed by an end effector of the robot, one or more grasp poses to be implemented by the robot's end effector, etc. Once the robot arrives at its destination, it can implement the robot plan autonomously and asynchronously from the manual human input. Meanwhile, the human operator may move on to other agricultural tasks assigned to other robots, which the human may influence asynchronously by predefining a robot plan or synchronously by manually controlling the robot once it reaches its destination plant.

In some implementations, a human operator may be able to create a robot plan using 2D and/or 3D vision data depicting the plant of interest. In some implementations, the vision data may be annotated, e.g., based on the agricultural task, so that the human operator is able to see what needs to be done and create a robot plan accordingly. For example, if fruit needs to be picked off a plant, those fruit may be highlighted, and the human operator may create a robot plan by operating a virtual robot claw/picker to grasp those fruit and remove them from the plant (e.g., by snipping their stems, pulling, etc.). In some such implementations, virtual operations of the robot claw/picker controlled by the human operator may be annotated as well, e.g., with lines and curves to represent trajectories.

In some implementations, the plurality of agricultural tasks may be presented to a human operator visually, e.g., on a computer display, tablet display, or even as part of a virtual reality ("VR") or augmented reality ("AR") display. In some such implementations, the agricultural tasks may be represented as a plurality of selectable tiles or icons. These tiles or icons may or may not be ranked, color-coded, animated, or otherwise organized/visually emphasized based on various measures, such as measures of robot performability discussed previously. For example, tiles representing agricultural tasks that would be difficult for a robot to perform autonomously may be rendered in a first color, tiles representing agricultural task that would be relatively simple for a robot to perform autonomously may be rendered in a second color, and other tiles representing intermediately-difficult agricultural tasks may be colored in other color(s). In some implementations, tiles may be grouped into clusters based on their relative measures of robot performability, and those clusters may be rendered on spatially-distinct portions of a display.

Additionally or alternatively, in some implementations, the tiles/icons representing agricultural tasks may be organized, visually emphasized, color-coded, etc., based on a current state of the robot assigned the agricultural task. For example, a tile representing an agricultural task for which a robot is still en route may be rendered in one manner (e.g., semi-transparently, dashed outline, particular color or shape, etc.) until the robot arrives at the target plant. Once the robot arrives, the tile representing the robot's agricultural task may be visually altered to inform the human operator that the robot is ready to be controlled manually/synchronously, if desired. As another non-limiting example, a tile representing an agricultural task for which a robot plan has not yet been predefined (and in some cases which has a robot performability score that is conducive to predefinition of a robot plan) may be rendered one way, e.g., to inform the human operator that there is still an opportunity to predefine the robot plan for that robot. Once the human operator predefines a robot plan for that task, the corresponding tile may be rendered differently (or demoted in rank, or otherwise put aside) so that the human operator can focus on other tiles for which asynchronous or synchronous robot control is possible.

FIG. 1 illustrates an environment in which one or more selected aspects of the present disclosure may be implemented, in accordance with various implementations. The example environment includes a plurality of client devices $106_{1-X}$, an agricultural task system 102, and a plurality of robots $108_{1-M}$. Each of components $106_{1-X}$, 102, and 108 may communicate, for example, through a network 110. Agricultural task system 102 is an example of an information retrieval system in which the systems, components, and techniques described herein may be implemented and/or with which systems, components, and techniques described herein may interface.

An individual (which in the current context may also be referred to as a "user") may operate a client device 106 to interact with other components depicted in FIG. 1. Each component depicted in FIG. 1 may be coupled with other components through one or more networks 110, such as a local area network ("LAN") or wide area network ("WAN") such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Each of client devices 106 and agricultural task system 102 may include one or more memories for storage of data and software applications, one or more processors for accessing data and executing applications, and other components that facilitate communication over a network. The operations performed by client device 106 and/or agricultural task system 102 may be distributed across multiple computer systems. In some implementations, agricultural task system 102 may be implemented as, for example, computer program(s) running on one or more computers in one or more locations that are coupled to each other through a network.

Each client device 106 may operate a variety of different applications that may be used, for instance, to perform agriculture analysis and/or to coordinate agricultural robot operation using techniques described herein. For example, a first client device $106_1$ operates agricultural task client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops. The wearer may interact with the presented data, e.g., using HMD input techniques such as gaze directions, blinks, etc., to coordinate robots 108 using techniques described herein.

In various implementations, agricultural task system 102 may include a vision data analysis engine 112, a robot coordination engine 114, a user interface engine 116, and/or one or more databases 118 for storing various data used by and/or generated by components 112-116, such as sensor data gathered by robots $108_{1-N}$, agricultural task information, and so forth. In some implementations one or more of engines 112-116 may be omitted. In some implementations all or aspects of one or more of engines 112-116 may be combined. In some implementations, one or more of engines 112-116 may be implemented in a component that is separate from agricultural task system 102. In some implementations, one or more of engines 112-116, or any operative portion thereof, may be implemented in a component that is executed by client device 106.

In this specification, the term "database" and "index" will be used broadly to refer to any collection of data. The data of the database and/or the index does not need to be structured in any particular way and it can be stored on storage devices in one or more geographic locations. Thus, for example, database(s) 118 may include multiple collections of data, each of which may be organized and accessed differently.

Vision data analysis engine 112 may be configured to receive or obtain, e.g., from database(s) 118 and/or directly from robots $108_{1-N}$, 2D and/or 3D vision data. In some implementations, vision data analysis engine 112 may receive other robot sensor data as well. This other sensor data may include, for instance, position coordinates such as inertial measurement units ("IMUs"), real-time kinematic ("RTK") coordinates, GPS coordinates, etc. 2D vision data may be originally obtained (and then stored in database(s) 118) from various sources. In the agricultural context these data may be obtained manually by human workers carrying cameras or other sensors, or automatically using one or more robots $108_{1-N}$ equipped with 2D/3D vision sensors. In some implementations, human workers may simply make observations about plants using their own senses, and may manually input those observations into a database (e.g., using a spreadsheet or other software application).

Individual robots $108_{1-N}$ may take various forms, such as an unmanned aerial vehicle $108_1$, a robot (not depicted) that is propelled along a wire, track, rail or other similar component that passes over and/or between crops, wheeled robots $108_{M-1}$ to $108_{M+N}$, or any other form of robot capable of being propelled or propelling itself past crops of interest. In some implementations, different robots may have different roles, e.g., depending on their capabilities. For example, in some implementations, one or more "scout" robots $108_1$ to $108_{M-1}$ may be designed to capture data, but not necessarily manipulate plants or perform physical agricultural tasks.

By contrast, one or more "worker" robots $108_M$ to $108_{M+N}$ may be configured to perform agricultural tasks (and in some cases may also serve as scout robots). In some cases, worker robots $108_{M-N}$ may be more complex (and sometimes more costly) than scout robots $108_1$ to $108_{M-1}$. For example, in FIG. 1, worker robot $108_M$ is equipped with one robot arm 120 that includes a gripper-style end effector. Worker robot $108_{M+N}$ is equipped with two robot arms, 120R and 120L. Robot arm 120L is equipped with another gripper-style end effector. Robot arm 120R, by contrast, is equipped with a spray end effector 122 that can be operated, for instance, to spray chemicals such as fertilizer, or even water, onto plants.

In some implementations, robots $108_1$ to $108_{M-1}$ (and any available worker robots $108_M$ to $108_{M+N}$ that are sufficiently capable of scouting) may scout along lines of crops taking pictures and/or gathering other sensor data (e.g., soil moisture, sunlight readings, temperatures, soil PH, etc.) at some selected frequency (e.g., every second or two, every couple of feet, every inch or few inches, etc.). These robots may provide sensor data they capture while scouting to agricultural task system 102, which may store this data in database(s) 118.

Based on analysis of the sensor (e.g., vision) data received from various robots 108 while scouting crops and/or from other sources (e.g., human workers), vision data analysis engine 112 (or robot coordination engine 114) may generate agricultural tasks and may assign them to individual robots 108. Vision data analysis engine 112 may perform various types of image processing analysis to determine various attributes and/or conditions of plants. These plant attributes and/or conditions may include, but are not limited to, sizes of individual fruit, fruit counts, plant dimensions (e.g., height, width), leaf attributes (e.g., count, angle, sizes, etc.), stem count, stem lengths, number of branches, evidence of pests (e.g., mites, slugs, aphids, etc.), plant health (e.g., alone or relative to other nearby plants), plant color, and so forth.

The types of image processing that may be performed by vision data analysis engine 112 may vary among implementations. In some implementations, vision data analysis engine 112 may analyze 2D and/or 3D vision data to perform object recognition and/or tracking, which can be used, for instance, to count and/or track plant-parts-of-interest such as fruits, flowers, nuts, berries, and/or other components that may have commercial or other value. For object recognition, vision data analysis engine 112 may utilize a variety of different techniques, including but not limited to appearance-based methods such as edge matching, divide-and-conquer, gradient matching, greyscale matching, histograms, and/or feature-based methods such as interpretation trees, pose clustering, geometric hashing, scale-invariant feature transform ("SIFT"), speeded up robust features ("SURF"), trained machine learning models (e.g., convolutional neural networks), and so forth. Object recognition techniques such as trained convolution neural networks may also be used to detect other attributes of plants, such as whether the plants are (or have been) infested with/damaged by pests such as aphids, slugs, or mammals (e.g., deer, squirrels, etc.), whether the plants are generally healthy (e.g., determined from size relative to other similarly-situated plants), whether they are over-watered or under-watered, etc.

Object tracking is the practice of tracking individual objects (e.g., fruits) across multiple instances of vision data, such as across multiple 2D digital images of a plant captured by a robot 108 from different perspectives while the robot travels among the plants. To perform object tracking, vision data analysis engine 112 may utilize techniques such as calculating a Euclidian distance between the raw image data, calculating the Euclidian distance between reduced-dimensionality data (e.g., using an encoder portion of a de-noising autoencoder), SIFT, SURF, features from accelerated segment test ("FAST"), keypoint matching, object recognition, and so forth. In some implementations, vision data analysis engine 112 may use plant-parts-of-interest detected across multiple vision files (e.g., 2D digital images) to formulate a bipartite graph matching problem that can be solved, for instance, using techniques such as the Hungarian algorithm.

In some implementations, vision data analysis engine 112 may have access to 3D vision data. For example, one or more scout robots $108_1$ to $108_{M-1}$ (or even some of worker robots $108_M$ to $108_{M+N}$) may be equipped with 3D vision sensors such as 3D cameras, light detection and ranging ("LIDAR") sensors, stereo cameras, and/or other sensors sometimes referred to as "2.5D" sensors such as RGBd cameras. In such implementations, vision data analysis engine 112 may perform various types of analysis that are possible using 3D vision data, such as object tracking based on distance between Euclidian coordinates (e.g., how far apart in 3D space are two plant-parts-of-interest detected in 3D data).

However, capturing native 3D vision data can be impractical for various reasons, such as it being relatively expensive to equip robots with 3D or 2.5D vision sensors. Accordingly, in some implementations in which robots are equipped with less expensive/complex 2D vision sensors, 3D data may be generated from multiple 2D digital images using techniques such as "structure from motion," or "SFM" processing. For example, a sequence of 2D digital images of plant(s) may be captured, e.g., by a robot moving alongside the plant(s). This sequence of 2D digital images may be analyzed using SFM processing to generate "synthetic" 3D data. This synthetic 3D data may then be used to perform various vision data analysis tasks mentioned previously, such as object tracking, object recognition, fruit measuring and counting, etc.

Robot coordination engine 114 may be configured to perform selected aspects of the present disclosure to coordinate deployment of scout robot(s) $108_1$ to $108_{M-1}$ and/or worker robots $108_M$ to $108_{M+N}$ acquire sensor data about a plurality of plants (e.g., crops in a field), generate agricultural tasks based on this sensor data, and/or to ultimately perform the agricultural tasks. For example, robot coordination engine 114 may maintain, e.g., in database(s) 118, an inventory of robots $108_{1-N}$ that includes information about those robots, such as their specifications, capabilities, current state, value, condition, etc.

Based on capabilities of the individual robots 108, robot coordination engine 114 may assign to individual robots 108 agricultural tasks generated by vision data analysis engine 112 and/or generated by other sources, such as agricultural personnel. For example, as part of the process of generating agricultural tasks, robot coordination engine 114 may identify, from its inventory in database(s) 118, one or more scout robots $108_1$ to $108_{M-1}$ and/or one or more worker robots $108_M$ to $108_{M+N}$ that are also equipped to perform scouting duties. Robot coordination engine 114 may then deploy those identified robots to travel among a plurality of plants to gather sensor data about the plants, including 2D and/or 3D vision data of the plants.

These sensor data collected by robots during scouting may be analyzed, e.g., by vision data analysis engine 112 as described previously. Based on this analysis, vision data analysis engine 112 may designate one or more individual plants of the plurality of plants as a target for performance of an agricultural task. Robot coordination engine 114 may then deploy one or more worker robots $108_M$ to $108_{M+N}$ among the plurality of plants to perform the plurality of agricultural tasks.

As described previously, worker robots $108_M$ to $108_{M+N}$ may not have sufficient dexterity to perform delicate agricultural tasks such as picking potentially fragile fruits, pruning branches, removing weeds, etc. Additionally or alternatively, robots may not yet be capable of performing these tasks because machine learning model(s) and/or policies that govern the robots' operation have not been sufficiently trained. Accordingly, in various implementations, worker robots $108_M$ to $108_{M+N}$ may operate more-or-less autonomously until they arrive at their destination, i.e., the plant that is the target of the robot's assigned agricultural task. At that point (or in some implementations before the robot arrives), a determination may be made of whether the robot is capable of performing the task autonomously. If the answer is yes, e.g., a probability the robot can perform the task without damaging the plant or itself satisfies some threshold, then the robot may be permitted to perform the task itself. However, if the answer is no, then the robot may transition into a manual control mode in which the robot is controlled by a human operator. The human operator may manually control the robot via operation one or more client devices $106_{1-X}$. For example, the human operator may operate agricultural task client 107 executing on first client device $106_1$ to manually control the robot to perform its assigned agricultural task. In situations in which the human operator controls the robot "live," or in real time, that control may be referred to herein as "synchronous."

In some implementations, when a given robot arrives at the plant that is the target of the agricultural task assigned to the given robot, robot coordination engine 114 may interact with user interface engine 116 to cause a manual control GUI to be provided, e.g., by user interface engine 116 to agricultural task client 107. This manual control GUI may be operable by the human operator to manually control the given robot to perform its agricultural task. Once the human operator operates the given robot to complete the task, the given robot may transition to a next agricultural task, which may have been previously assigned to the given robot or may be assigned dynamically based on the given robot's completion of its previous agricultural task.

For example, unassigned agricultural tasks may be analyzed to identify a subset of one or more candidate agricultural tasks that may be assigned to the given robot based on a variety of factors, such as the given robot's capabilities, available resources (e.g., battery power), location, etc. For example, a subset of the agricultural tasks may be identified for which the given robot is capable of performing. That subset of agricultural tasks may be ranked based on the distances between those candidate agricultural tasks' targeted plants and the given robot's current location. The given robot may then be assigned to the highest-ranked agricultural task.

As noted previously, in some implementations, a human operator may be able to manually control a robot asynchronously instead of synchronously. For example, rather than waiting for a robot to arrive at the plant targeted by the robot's assigned agricultural task, a human operator may proactively request a "virtual" manual control interface, e.g., from user interface engine 116. This virtual manual control interface is so-named because the human operator may control a virtual robot to virtually perform the agricultural task ahead of time. The human operator's actions while controlling the virtual robot may be used to generate what is referred to herein as a "robot plan." The robot plan may include various robot actions, end effector trajectories, grasp poses, etc., that may be implemented by the robot once it arrives at its target plant. But by that time, the human operator has been able to move onto other tasks.

Figure 2:
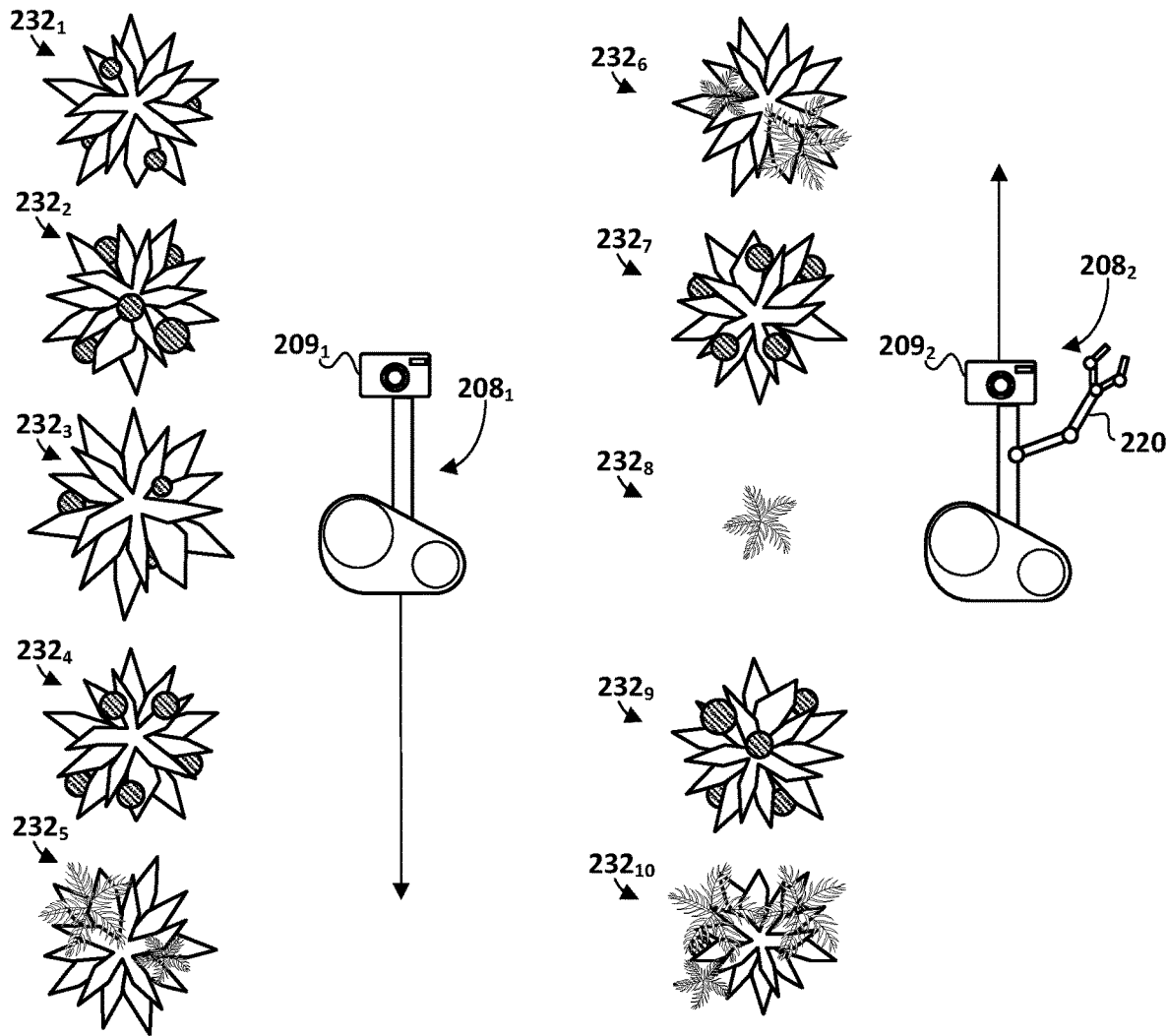
FIG. 2 depicts an example field of plants being scouted by multiple robots to generate agricultural tasks to be performed on the plants.

FIG. 2 depicts an example field of plants $232_{1-0}$ being scouted by multiple robots $208_{1-2}$ to generate agricultural tasks to be performed on the plants. First scouting robot $208_1$ is moving in the downward direction and is gathering vision data about a first row of plants $232_{1-5}$ using its vision sensor $209_1$. Second scouting robot $208_2$—which may also be used as a working robot since it has a robot arm 220—is moving in the downward direction and is gathering vision data about a second row of plants $232_{6-10}$ using its vision sensor $209_2$.

From the vision data gathered by robots $208_{1-2}$, vision data analysis engine 112 may make various observations about plants $232_{1-10}$. These observations can be used by vision data analysis engine 112 (or another component of agricultural task system 102) to generate agricultural tasks. For example, second plant $232_2$, fourth plant $232_4$, seventh plant $232_7$, and ninth plant $232_9$ appear ready for harvesting because they have multiple fruits that are relatively large. By contrast, first plant $232_1$ and third plant $232_3$ are not ready for harvesting because their fruit are less numerous and/or smaller. Additionally, fifth plant $232_5$ and tenth plant $232_{10}$, which are proximate each other across rows, are being overtaken and/or entangled by weeds. The same is true for sixth plant $232_6$. Eighth plant $232_8$ has been killed off entirely, leaving only a weed in its place.

From these observations, a plurality of agricultural tasks may be generated, e.g., by vision data analysis engine 112 and/or robot coordination engine 114. At least some of these agricultural tasks associated with the first row of plants $232_{1-5}$ are manifested as operable elements (e.g., selectable tiles) $350_{1-5}$ in FIG. 3A. Operable elements $350_{1-5}$ in particular are presented by an example GUI 360 entitled "2019 HYPOTHETICAL FARMS AGRICULTURAL TASK LIST." GUI 360 may or may not be rendered on one or more client devices 106, e.g., as part of agricultural task client 107.

First operable element $350_1$ is associated with an agricultural task generated based on observations of first plant $232_1$. As noted previously, first plant $232_1$ is not ready for harvest. Accordingly, first operable element $350_1$ is associated with task 00001, "Spray w/fertilizer." As noted in first operable element $350_1$, this task is to be performed automatically (autonomously) by a robot that is currently en route to first plant $232_1$. Second operable element $350_2$ is associated with second plant $232_2$, which is ready for harvest. Accordingly, second operable element $350_2$ is associated with task 00002, "harvest fruit," which is to be performed manually "upon arrival" of a robot to second plant $232_2$.

Third operable element $350_3$ is associated with third plant $232_3$, which is not ready for harvest but is in need of pruning. Accordingly, third operable element $350_3$ is associated with task 00003, "prune," which is to be performed manually "upon arrival" of a robot to third plant $232_3$. Fourth operable element $350_4$ is associated with fourth plant $232_4$, which is ready for harvest. Accordingly, fourth operable element $350_4$ is associated with task 00004, "harvest fruit," which is to be performed manually "upon arrival" of a robot to fourth plant $232_4$. And fifth operable element $350_5$ is associated with fifth plant $232_5$, which is being overtaken by weeds. Accordingly, fifth operable element $350_5$ is associated with task 00005, "pick weed(s)," which is to be performed manually "upon arrival" of a robot to fifth plant $232_5$.

Figure 3A:
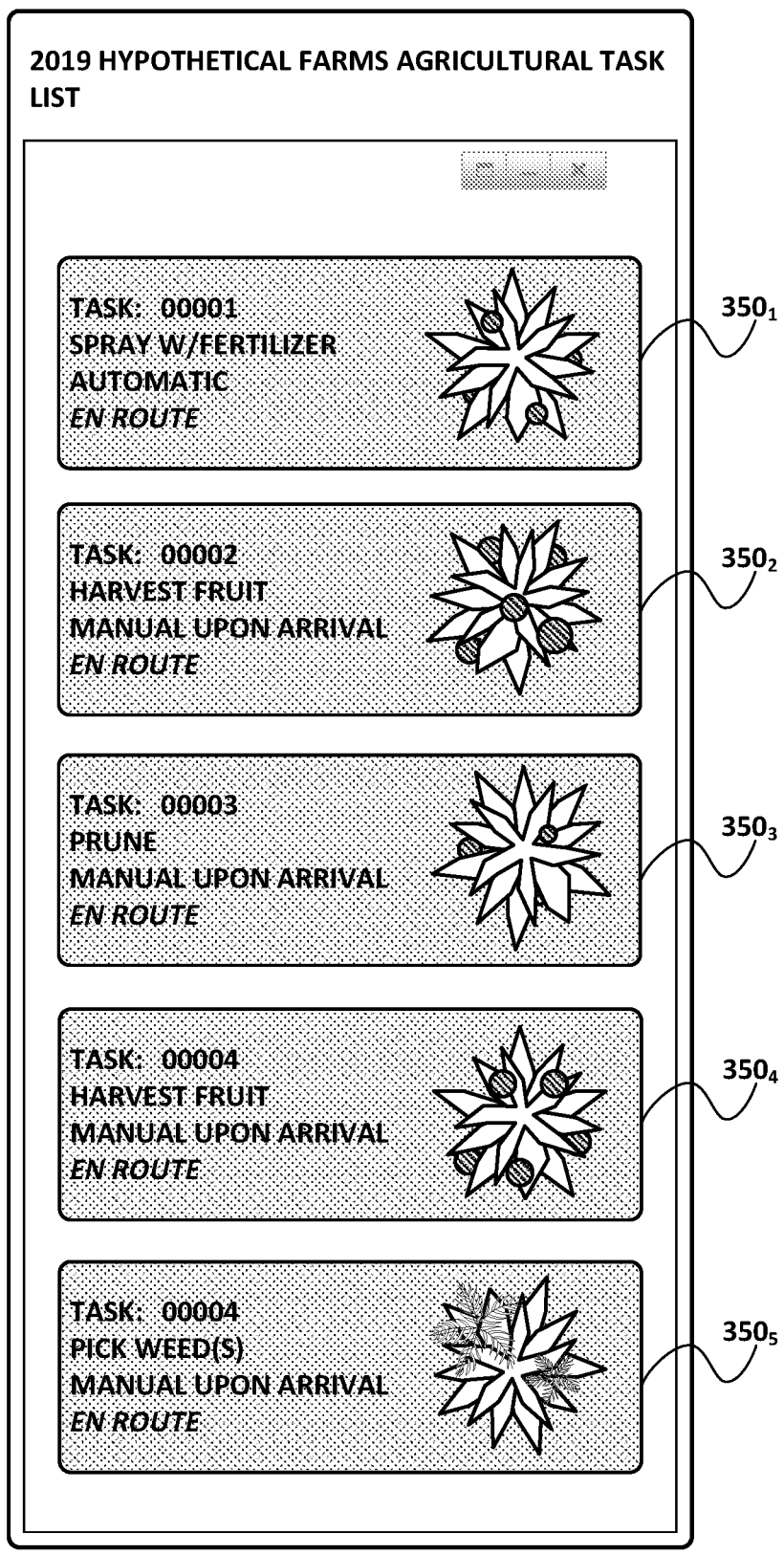
FIG. 3A, FIG. 3B, FIG. 3C, FIG. 3D, and FIG. 3E depict example graphical user interfaces ("GUIs") that may be interacted with by a human operator to coordinate performance of the agricultural tasks generated from the scouting of FIG. 2.

In FIG. 3A, the robots assigned the agricultural tasks associated with operable elements $350_{1-5}$ have only just been deployed, and have not yet reached their respective target plants. Accordingly, each of operable elements $350_{1-5}$ indicates a current status on the bottom line of "en route." In some implementations, the assigned robots cannot be interacted with or controlled until they reach their target plants. Assuming that's the case in this example, operable elements $350_{1-5}$ are shaded to indicate that they may not yet be operable, or at least not operable to commandeer control of the robots.

Figure 3B:
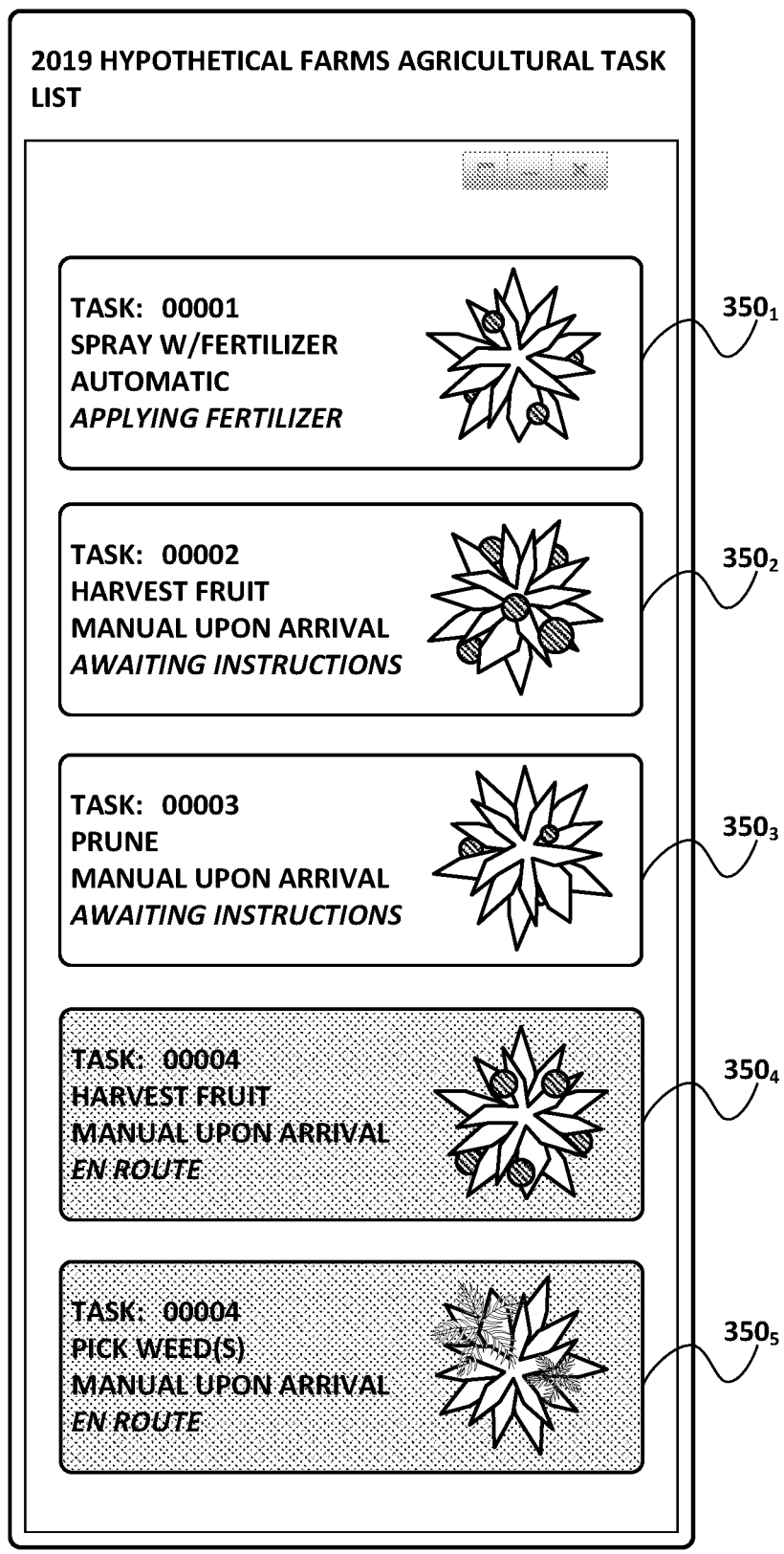

In FIG. 3B, by contrast, operable elements $350_{1-3}$ are no longer shaded because the respective robots assigned the underlying agricultural tasks have arrived at the target plants. Recall that first operable element $350_1$ is associated with an agricultural task, "spray w/fertilizer," that is intended to be performed by a robot automatically. Accordingly, because that robot has since arrived at the plant ($232_1$) targeted by the agricultural task 00001 underlying first operable element $350_1$, the robot has begun applying the fertilizer, as indicated by its status, "applying fertilizer." In some cases a human operator could select first operable element $350_1$ if, for instance, the human operator wanted to watch real-time application of the fertilizer (e.g., in a viewfinder that renders vision data captured by a vision sensor integral with that robot), or if the human operator wanted to commandeer control of the robot to apply the fertilizer manually. But otherwise the human operator can take no action, and once the robot has completed its application of fertilizer to first plant $232_1$, that robot may be assigned another agricultural task.

Second and third operable elements $350_{2-3}$, on the other hand, both indicate a state of "awaiting instructions" because their respective underlying tasks, "harvest fruit" and "prune," require manual intervention by a human operator. A human operator may select either of these operable elements $350_{2-3}$ to gain control of the respective robot assigned the underlying agricultural task.

Suppose a human operator selects second operable element $350_2$. In some implementations, the human operator may be presented with the GUI 362 depicted in FIG. 3C. GUI 362 includes a window 364 that depicts vision data captured by a vision sensor of a robot assigned the agricultural task (00002) underlying second operable element $350_2$ in FIG. 3B. Consequently, second plant $232_2$ is visible in window 364. Also visible are two robot arms, 320L and 320R, which the human operator can remote control manually to pick fruit from second plant $232_2$.

Figure 3C:
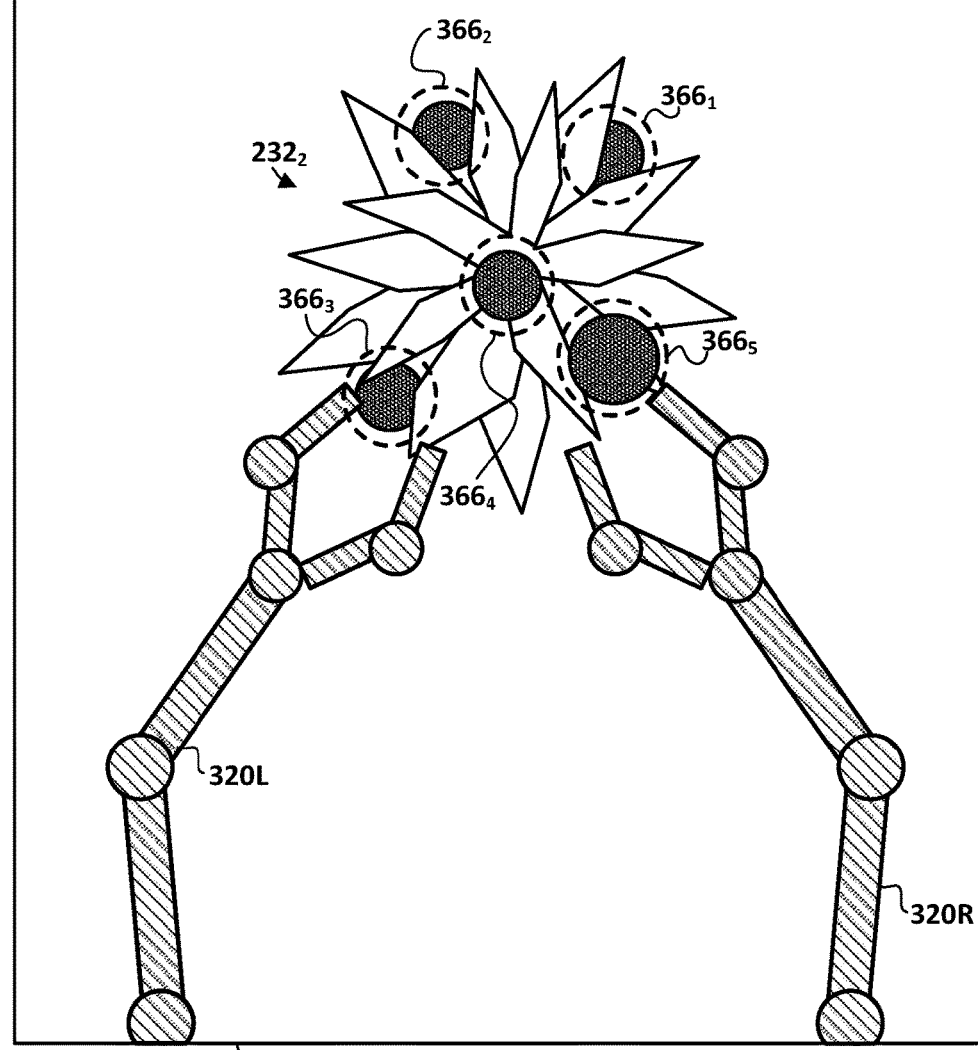

In some implementations, one or more components of agricultural task system 102, such as vision data analysis engine 112, may apply annotations to vision data based on its analysis of vision data received during prior scouting of a field of plants. These annotations may aid a human operator in manually controlling a robot to perform an agricultural task. An example of this is depicted in FIG. 3C, where five visual annotations $366_{1-5}$ are depicted in the form of bounding shapes around five different fruit of second plant $232_2$. These bounding shapes may have been detected in vision data gathered previously, e.g., by scouting robots $108_1$ to $108_{M-1}$. These annotations $366_{1-5}$ may help the human operator 232 understand what needs to be done to fulfill the agricultural task. In this example, that task is picking fruit, and the annotations $366_{1-5}$ call out where the fruit is that needs to be picked. While annotations $366_{1-5}$ are depicted as circles, this is not meant to be limiting, and bounding shapes used for such purposes may take any number of forms.

FIG. 3C to control a robot to perform the agricultural task 00002. For example, the human operator may be working on a client device 106 that includes multi-window capabilities (e.g., as part of an operating system), and GUIs 360 and 362 may be rendered on different parts of the screen, or on different screens in a multi-screen environment. Alternatively, the human operator may be able to switch between GUIs 360 and 362.

Figure 3D:
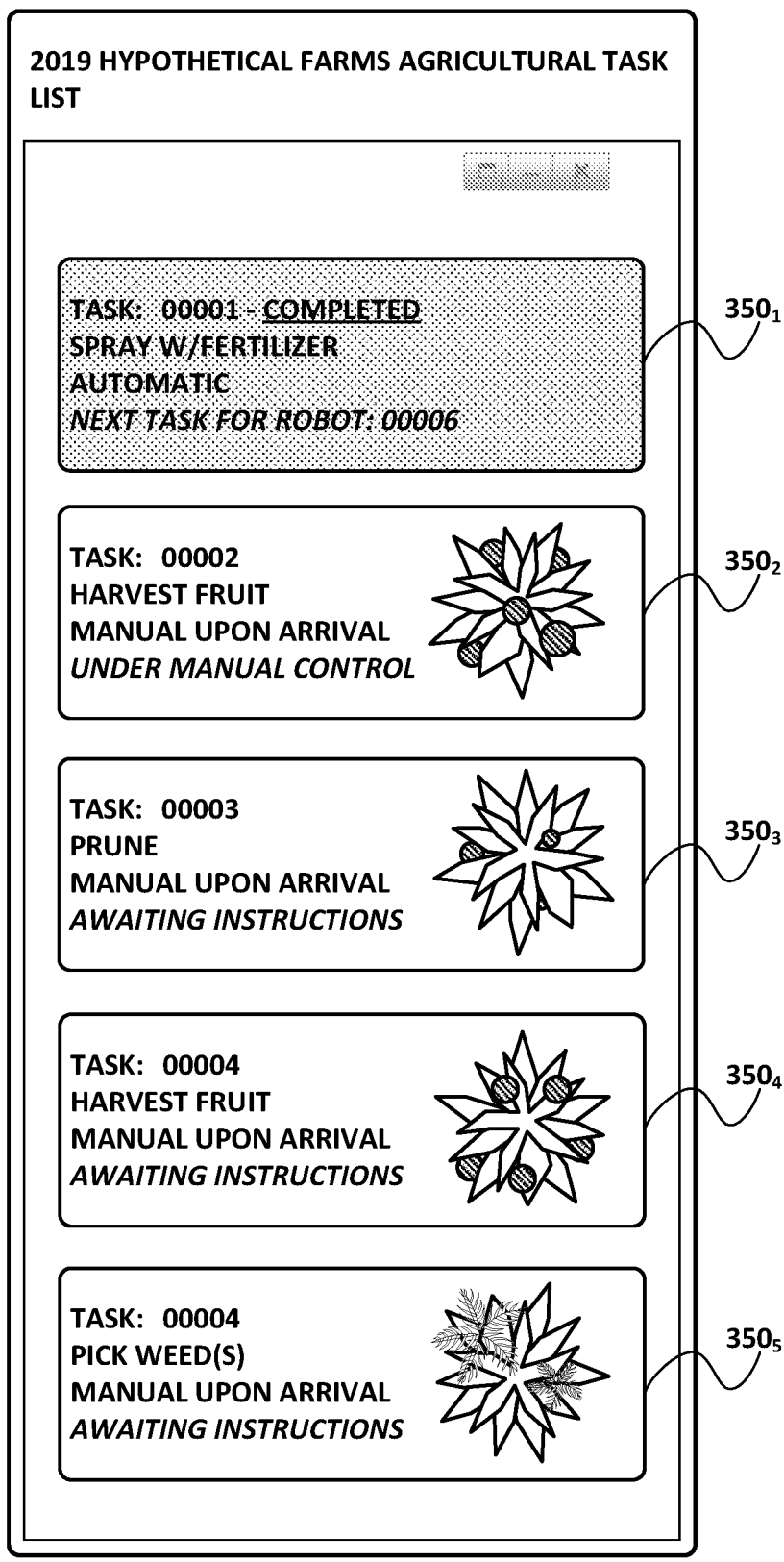

In FIG. 3D, operable elements $350_{2-5}$ are now unshaded because all of the robots assigned their underlying agricultural tasks have arrived at their respective target plants. And as shown in FIG. 3D, operable elements $350_{3-5}$ indicate a current status of "awaiting instructions." Second operable element $350_2$ shows a status of "under manual control" because as noted previously, the human operator has not yet finished controlling the robot to pick fruit from second plant $232_2$. In some implementations, the human operator can leave task 00002 open and switch to another task, such as any of tasks 00003-000005 underlying operable elements $350_{3-5}$, by selecting any one of those operable elements $350_{3-5}$. The robot associated with second operable element $350_2$ may simply standby until the human operator "returns," e.g., by clicking second operable element $350_2$.

First operable element $350_1$ has been re-shaded because its underlying agricultural task 00001 has been "completed." Consequently, the current status of first operable element $350_1$ indicates a next agricultural task, 00006, that has been assigned to the robot. As will be seen shortly, once that robot has departed for its next task, first operable element $350_1$ may be replaced with a new operable element ($350_6$ in FIG. 3E) that represents the new agricultural task assigned to that robot.

Figure 3E:
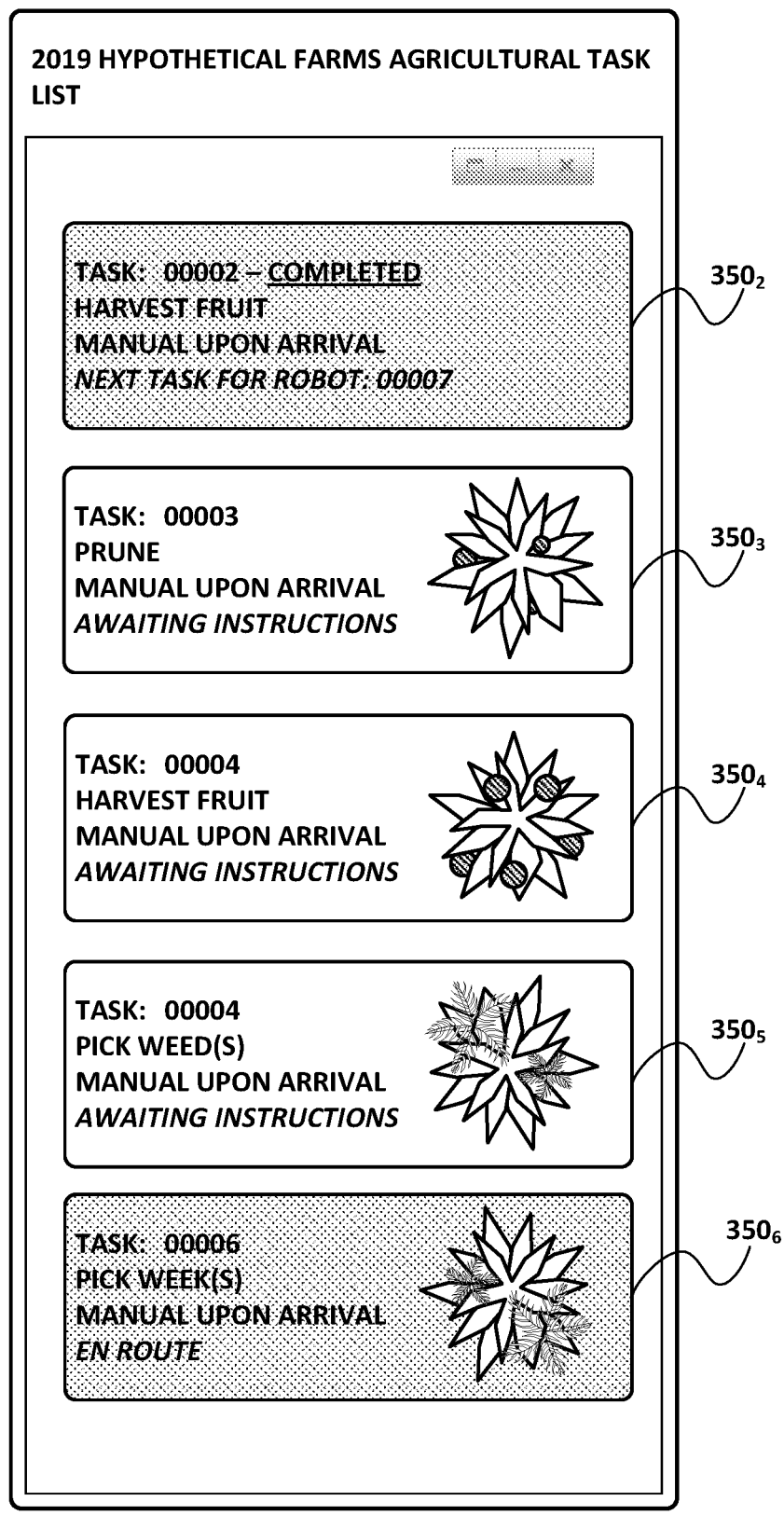

FIG. 3E depicts GUI 360 at some later time after the human operator has finished interacting with GUI 362 (FIG. 3C) to control the robot to perform the agricultural task 00002 underlying second operable element $350_2$, which now indicates that task 00002 is completed. A current status conveyed by second operable element $350_2$ is that the robot, which was manually operated to complete that task 00002, has now been assigned a new task 00007.

Additionally, in FIG. 3E, a new operable element $350_6$ is rendered that identifies a new task 00006 that has been assigned to the robot that previously performed the agricultural task 00001. For the task 00006, the robot is supposed to be manually operated upon arrival at sixth plant $232_6$ in FIG. 2 to "pick weed(s)." This task may have been assigned to that robot because the target plant ($232_6$) is the closest to the plant ($232_1$) previously operated on by the robot (when it previously sprayed fertilizer onto first plant $232_1$).

In FIGS. 3A-B and D-E, the operable elements $350_{1-5}$ are presented more or less in the order that the first row of plants $232_{1-5}$ were scouted by robot $208_1$ in FIG. 2. However, this is not meant to be limiting. Operable elements in general may be rendered on user interfaces in different orders and/or in manners that are selected based on a variety of signals. For example, and as discussed previously, agricultural tasks may be assigned, e.g., by vision data analysis engine 112, robot performability scores, or measures of robot performability. Measures of robot performability may indicate how likely a robot will be able to autonomously perform the agricultural tasks without posing unacceptable risk(s) to the plant, or to other robots/equipment. These measures of robot performability may be used, for instance to rank operable elements. As a result, the human operator's attention is focused on those agricultural tasks which are most likely to require human intervention.

Additionally or alternatively, in some implementations, operable elements may be rendered only if their underlying agricultural tasks have measures of robot performability that fail to satisfy some minimal threshold. In other words, operable elements may not be rendered at or (or at least may be rendered less prominently) for agricultural tasks that a robot is likely to be able to perform without much risk of harming itself or the plant. These agricultural tasks typically require less dexterity, and may include tasks such as spraying a plant with chemicals/fertilizer, picking an entire plant from the ground (e.g., which may be the case with plants such as lettuce or cabbage), watering a plant, releasing anti-pest agents such as aphid-eating beneficial bugs (e.g., ladybugs) near a plant, and so forth.

A measure of robot performability may be determined, e.g., by vision data analysis engine 112, in various ways based on various data points. For example, in some implementations, particular agricultural tasks may be preassigned robot performability scores, e.g., in a database or lookup table. These preassigned scores may be determined, for instance, based on empirical evidence and/or based on observations from agricultural and/or robotic personnel.

Additionally or alternatively, in some implementations, machine learning model(s) may be trained to predict, e.g., based on vision data of a plant, a measure of robot performability associated with an agricultural tasks. In some implementations, supervised, semi-supervised, or even unsupervised learning may be employed to train, for example, a convolutional neural network ("CNN") to predict such measures. The CNN may be trained with training examples that depict various plants in various poses/configurations. In some implementations, the training examples may be labeled with measures of robot performability. These labels may be compared to output of the CNN generated based on the training examples to optimize a loss function of the CNN, e.g., using techniques such a gradient descent, back propagation, etc. The labels may be assigned to the training examples by humans, or based on prior robot attempts to perform agricultural tasks on the plants depicted in the training data.

For example, suppose a robot damaged a plant depicted in a training example when the robot attempted to autonomously perform an agricultural task on the plant. That training example may be used as a negative training example, e.g., with its label being a low robot performability score, or simply a binary value indicating failure. By contrast, suppose another robot successfully and autonomously performed an agricultural task on another plant depicted in another training example. That second training example may be used as a positive training example, e.g., with its label being a relatively high robot performability score, or simply a binary value indicating success.

Figure 4:
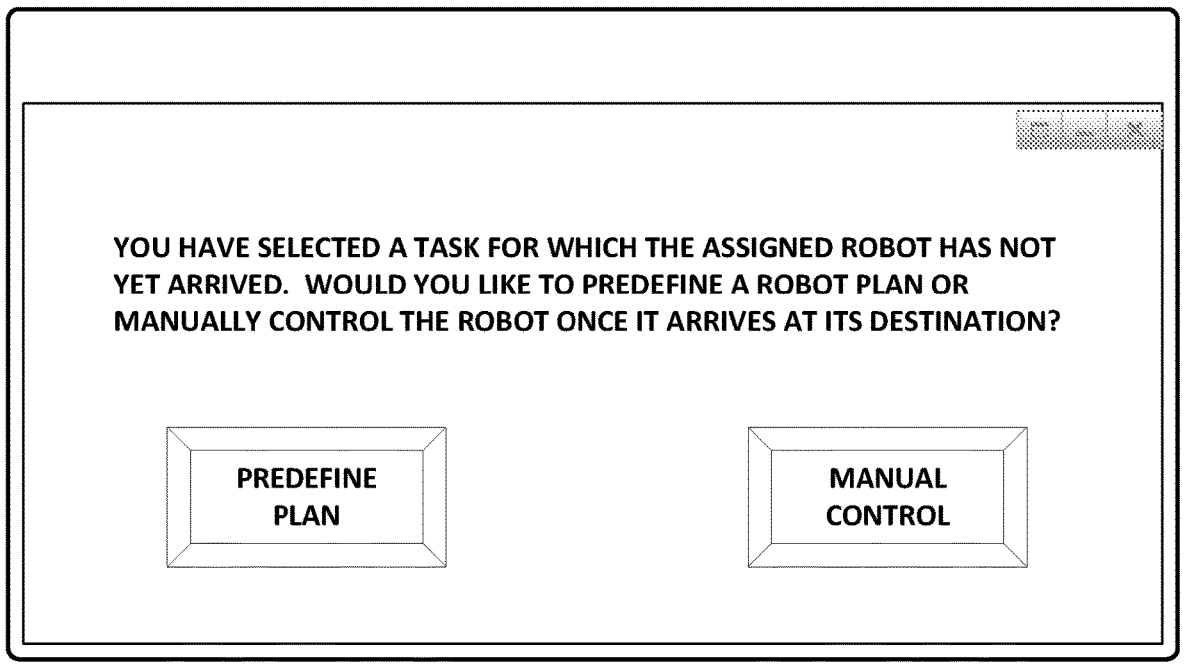
FIG. 4 depicts another GUI that may be operable by the human operator to select between synchronous (manual) and asynchronous (predefined) control of a robot.

As noted previously, in some implementations, human operators are not limited to synchronous control of robots after those robots have arrived at their target plants. In some such implementations, human operators may be able to predefine robot plans that can be implemented by robots later, e.g., in an asynchronous manner. FIG. 4 depicts another GUI 468 that may be operable by the human operator to select between synchronous (manual) and asynchronous (predefined) control of a robot. GUI 468 may be presented to a human operator when, for instance, the human operator selects an operable element $350_2$ before the corresponding robot arrives at its destination plant ($232_2$).

If the human operator selects the "manual control" button of GUI 468, in some implementations, GUI 360 may regain primary focus on the user's screen, and operable element $350_2$ that the human operator previously clicked may be available for selection, e.g., once the robot arrives at the target plant ($232_2$). On the other hand, if the human operator selects the "predefine plan" button of GUI 468, the human operator may be presented with a "virtual control" or "asynchronous control" GUI 470 depicted in FIG. 5.

Figure 5:
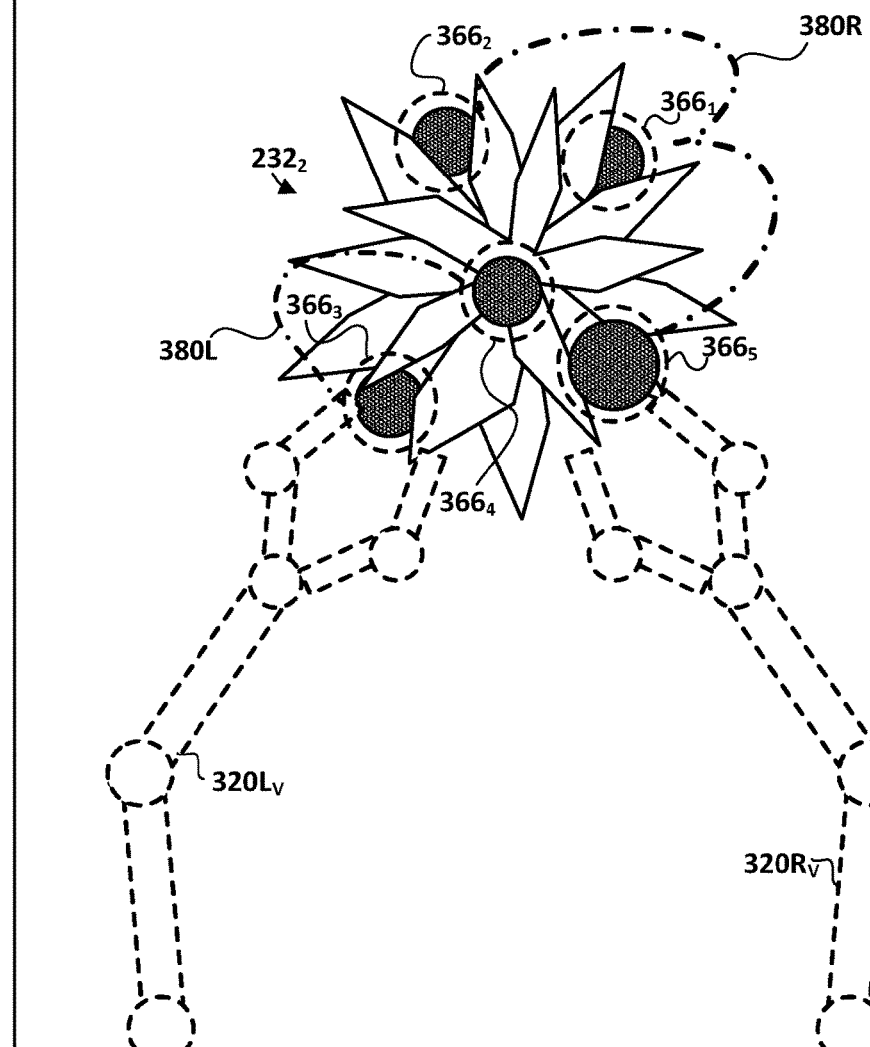
FIG. 5 depicts an example GUI that enables asynchronous control of a robot.

Virtual control GUI 470 in FIG. 5 is similar to GUI 362 in FIG. 3C. The same plant $232_2$ and annotations $366_{1-5}$ that were depicted in FIG. 3C are depicted in FIG. 4, for instance. However, rather than depicting physical robot arms 320L and 320R as detected by a vision sensor, in FIG. 5, virtual control GUI 470 depicts virtual arms 320Lv and 320Rv, as represented by the dashed lines. Virtual arms 320Lv and 320Rv may be controlled by a human operator to perform the task (picking fruit in accordance with annotations $366_{1-5}$) in a similar fashion as in FIG. 3C. However, because the robot has not actually arrived at second plant $232_2$ yet, the human operator's inputs may be recorded prospectively, e.g., as a robot plan.

This robot plan, which may include end effector trajectories, grasp poses, etc., can be implemented by the robot later, after the robot arrives at plant $232_2$. In FIG. 5, for instance, a trajectory 380L of virtual robot arm 320Lv and a trajectory 380R of virtual robot arm 320Rv are depicted. These trajectories 380L, 380R travel amongst the various fruits. They may be recorded, along with grasp poses implemented to grasp the fruits, and then implemented automatically by the robot later after the robot actually arrives at plant $232_2$.

There is some risk that a plant may change between the time it is scouted, the time a human operator prospectively creates a robot plan using virtual control GUI 470, and the time the robot actually arrives. For example, one or more fruit may have fallen off, the wind may have blown the fruit to different locations, the plant may have been damaged (accidentally by agricultural personnel or otherwise by pest or animals), etc. Accordingly, in some implementations, various checks may be performed by the robot once it arrives at the plant to ensure the robot plan is still viable.

For example, in some implementations, the vision data captured during scouting and the vision data captured by the robot once it arrives at plant $232_2$ may be compared to ensure that plant $232_2$ has not changed so much that the robot plan would no longer be effective. In some such implementations, some threshold difference in appearance or similarity (e.g., Euclidian distance between raw data) between the two instances of vision data may trigger abandonment of the robot plan. In such a scenario, a human operator may be prompted to perform the task manually, and the robot plan may be discarded.

The interfaces depicted in FIGS. 3A-E, 4, and 5 are not meant to be limiting. Any number of other interfaces may be used instead. For example, GUIs 360, 362, 468, and 470 take the form of windows that might be rendered on a computer display, tablet computer, mobile device screen, etc. Other types of interfaces might be rendered on other types of displays, such as display(s) integral with a HMD. For example, operable elements may be rendered as 3D objects that a human operator wearing the HMD can select using, for instance, their gaze, by blinking, by issuing voice commands, etc.

Figure 6:
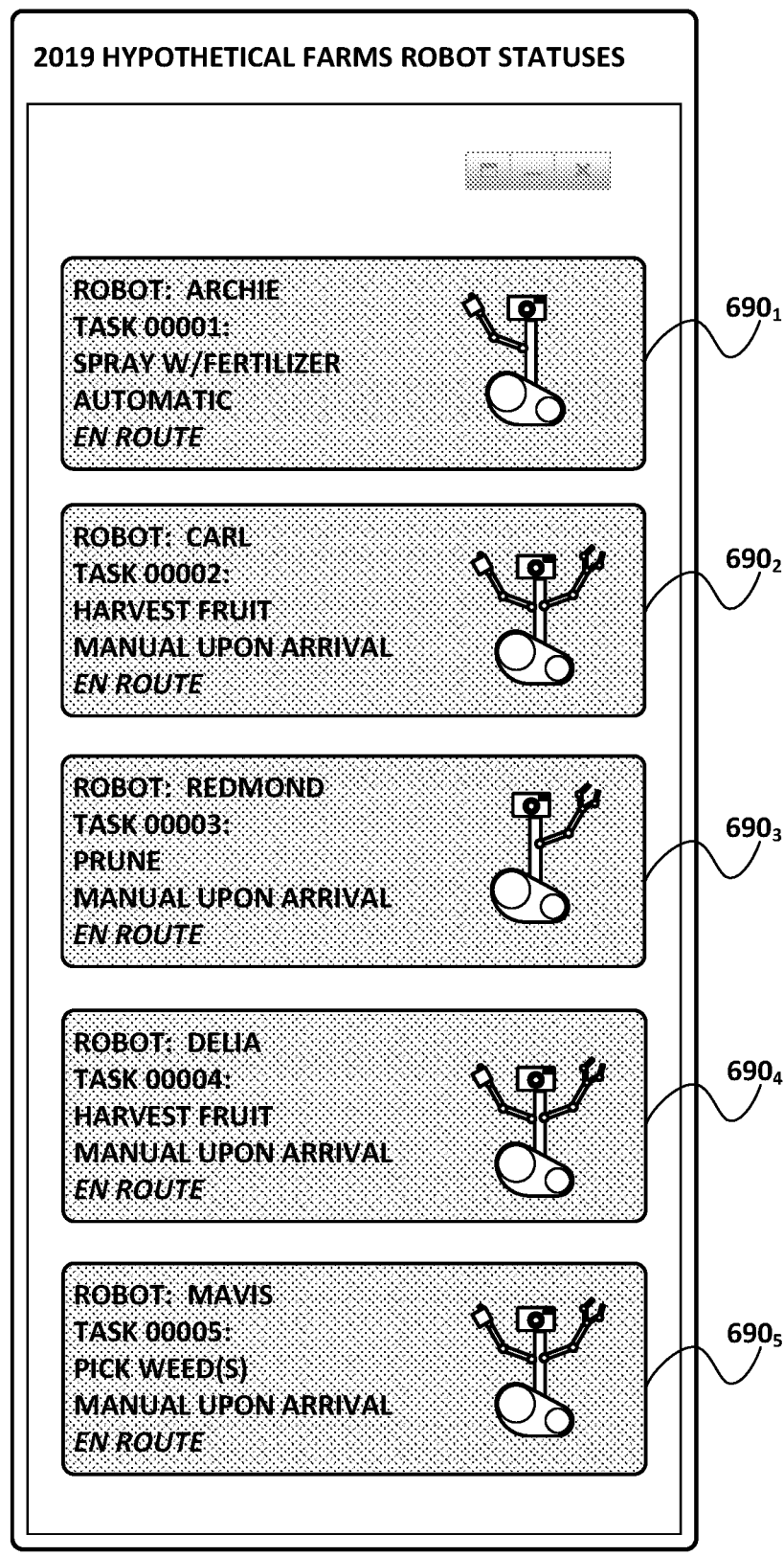
FIG. 6 depicts another example GUI that may be interacted with by a human operator to coordinate performance of agricultural tasks.

In some implementations, interfaces rendered/provided/ generated by user interface engine 116 may focus on the robots themselves, rather than on their assigned agricultural tasks. Once such example is GUI 688 in FIG. 6. GUI 688 is similar to GUI 360 in FIG. 3A in many respects. However, rather than operable elements $350_{1-5}$ corresponding to agricultural tasks 00001-00005, with GUI 688, a plurality of operable elements $690_{1-5}$ correspond to five different robots named "Archie," "Carl," "Redmond," "*Delia*," and "Mavis."

Similar to FIG. 3A, each robot has been assigned a particular agricultural task. For example, Archie is assigned task 00001 of "spray w/fertilizer," Redmond has been assigned the task 00003 of "prune," and so forth. And each operable element 690 indicates a status of the robot, which is currently "en route" for all five robots. Similar to before, a human operator may click on an operable element 690 to view more information about the agricultural task to which the selected robot is assigned, or to predefine a robot plan to be implemented by the robot upon its arrival at a target plant. Or, once a given robot arrives at its target plant, the robot's corresponding operable element 690 may be updated so that its status reads something like, "awaiting instructions." The human operator could then click that operable element 690 to open an interface similar to that depicted in FIG. 3C.

Figure 7:
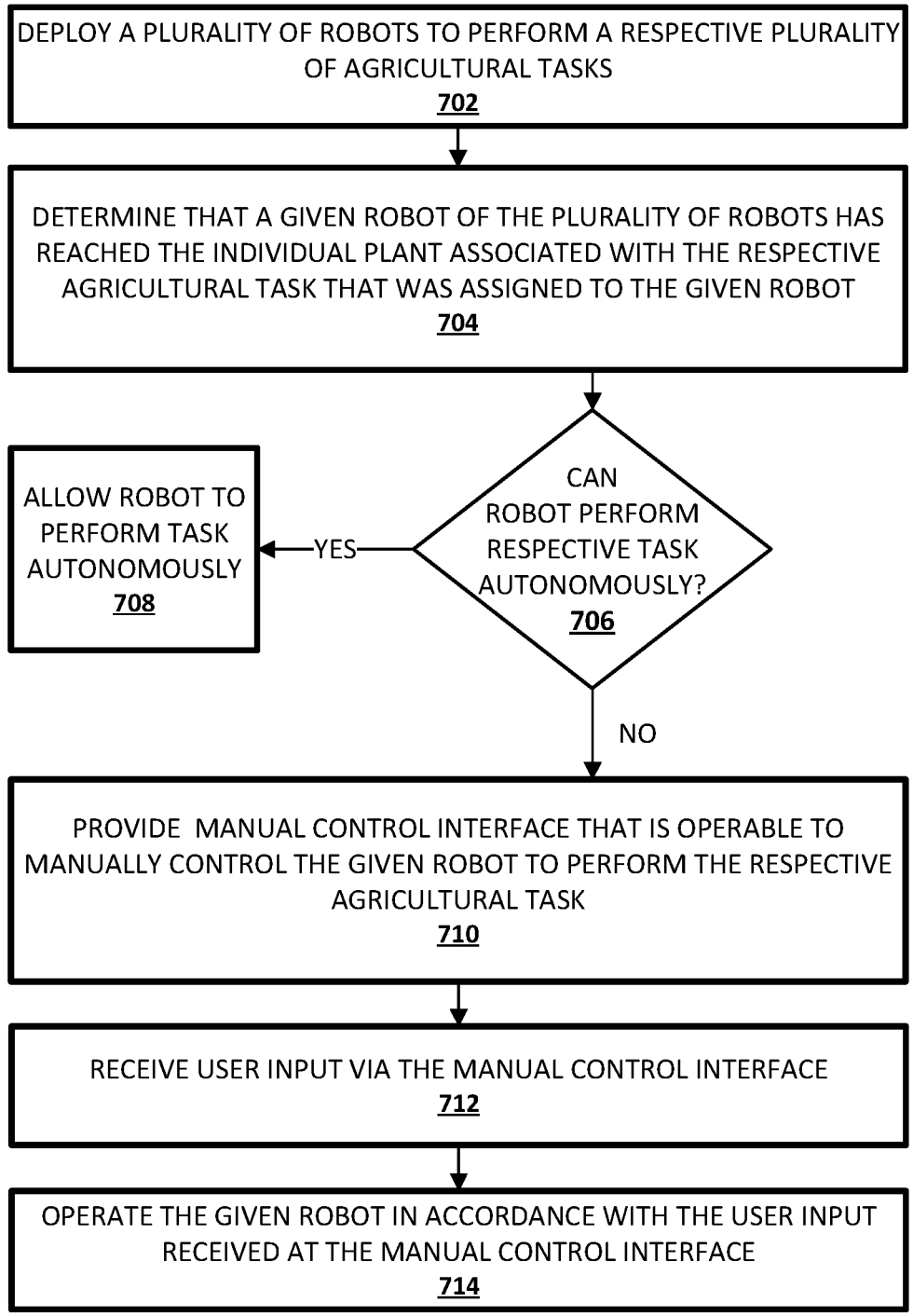
FIG. 7 depicts a flowchart of an example method in accordance with various implementations described herein.

FIG. 7 illustrates a flowchart of an example method 700 for practicing selected aspects of the present disclosure. The operations of FIG. 7 can be performed by one or more processors, such as one or more processors of the various computing devices/systems described herein, such as by agricultural task system 102. For convenience, operations of method 700 will be described as being performed by a system configured with selected aspects of the present disclosure. Other implementations may include additional steps than those illustrated in FIG. 7, may perform step(s) of FIG. 7 in a different order and/or in parallel, and/or may omit one or more of the steps of FIG. 7.

At block 702, the system, e.g., by way of robot coordination engine 114, may deploy a plurality of robots, such as worker robots $108_M$ to $108_{M+N}$, to perform a respective plurality of agricultural tasks. Each agricultural task of the plurality of agricultural tasks may be associated with a respective plant of a plurality of plants, e.g., in a field. And each plant of the plurality of plants may have been previously designated as a target for one of the agricultural tasks, e.g., by agricultural task system 102.

At block 704, the system may determine that a given robot of the plurality of robots has reached the individual plant associated with the respective agricultural task of the plurality of agricultural tasks that were assigned to the given robot. For example, the robot may send a transmission to agricultural task system 102 and/or robot coordination engine 114 that signals its arrival at the plant that is the target of the robot's agricultural task.

Based at least in part on determining at block 704 that the given robot has arrived at its target plant, at block 706, the system may determine whether the robot is capable of performing the agricultural task without harming the plant, the plant's commercial produce, or the robot itself. For example, in some implementations, a probability that the robot will be able to perform its assigned agricultural task without harming the plant or its produce may be determined. If that probability satisfies some threshold, the robot may be allowed to perform the task. In some implementations, there may be a lesser range of probabilities that indicate a robot is likely going to be able to perform the task, but with somewhat less confidence. In some such implementations, a human operator may be given a choice as to whether to allow the robot to perform the agricultural task autonomously or to control the robot remotely to perform the task. The determination at block 706 does not necessarily have to be performed once the robot arrives at the plant. In some cases this determination may be made as soon as the agricultural task is assigned to a particular robot (in which case the robot's capabilities will be known).

If it is determined at block 706 that the robot can perform the agricultural task autonomously, then method 700 may proceed to block 708, and the robot may be allowed to perform the agricultural task autonomously. However, if it is determined at block 706 that the robot cannot (at least with an acceptable measure of confidence) perform the agricultural task autonomously, then method 700 may proceed to block 710.

At block 710, the system may provide, at one or more output components of any one of client devices $106_{1-X}$ that are in network communication (e.g., via 110) with the given robot, a manual control interface that is operable to manually control the given robot to perform the respective agricultural task. One example of such a manual control interface was depicted at 362 in FIG. 3C.

At block 712, the system may receive user input via the manual control interface. For example, the human operator may operate one or more input devices, such as a keyboard, mouse, joystick(s), touchscreen, etc., to provide inputs to control robot arm(s), end effectors, etc. At block 714, the system may operate the given robot in accordance with the user input received at the manual control interface. For example, the user input may be relayed directly to the given robot, or may be processed, e.g., by robot coordination engine 114, and then sent to the given robot.

Figure 8:
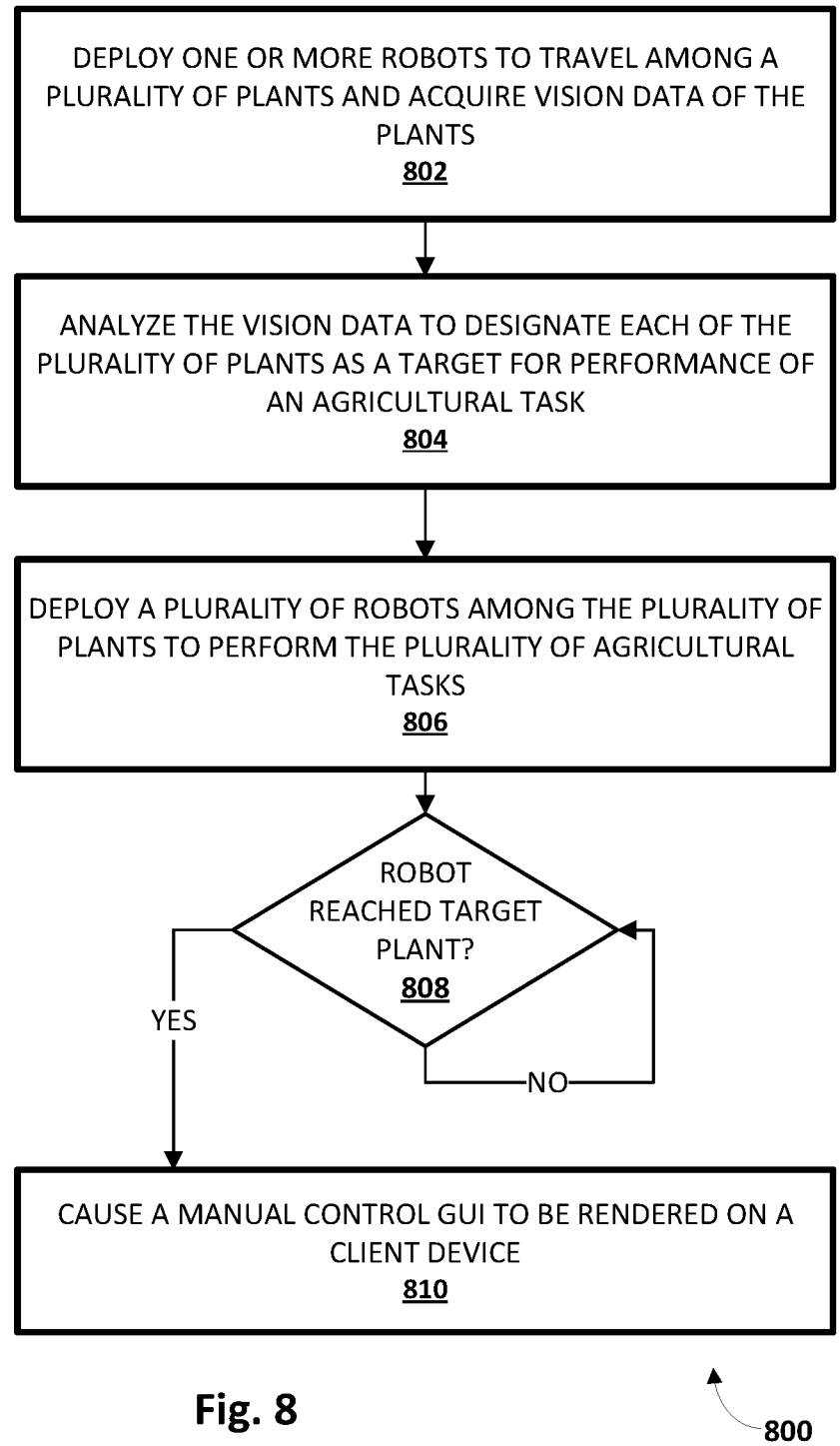
FIG. 8 depicts a flowchart of an example method in accordance with various implementations described herein.

FIG. 8 illustrates a flowchart of an example method 800 for practicing selected aspects of the present disclosure. The operations of FIG. 8 can be performed by one or more processors, such as one or more processors of the various computing devices/systems described herein, such as by agricultural task system 102. For convenience, operations of method 800 will be described as being performed by a system configured with selected aspects of the present disclosure. Other implementations may include additional steps than those illustrated in FIG. 8, may perform step(s) of FIG. 8 in a different order and/or in parallel, and/or may omit one or more of the steps of FIG. 8.

At block 802, the system, e.g., by way of robot coordination engine 114, may deploy one or more robots, such as one or more scout robots $108_1$ to $108_{M-1}$, to travel among a plurality of plants and acquire vision data of the plants. As noted previously, any robot equipped with vision sensor(s) may potentially be used as a scout robot, regardless of whether that robot is also used later as a worker robot to perform an agricultural task.

At block 804, the system, e.g., by way of vision data analysis engine 112, may analyze the vision data gathered at block 802 to designate each of the plurality of plants as a target for performance of an agricultural task. As used herein, "to designate each of the plurality of plants" does not necessarily mean that every single plant in a given field will be assigned an agricultural task. The vision data gathered at block 802 may reveal, for instance, that some plants are not currently in need of intervention.

At block 806, the system, e.g., by way of robot coordination engine 114, may deploy a plurality of robots among the plurality of plants to perform the plurality of agricultural tasks. The operations of block 806 may be similar to the operations of block 702 of method 700. At block 808, a determination may be made, e.g. by robot coordination engine 114, whether any of the robots deployed at block 806 has reached a target plant. This determination may be based on, for example, a signal from a robot indicating that it has arrived at its target plant and is awaiting further instructions.

Based at least in part on a determination at block 808 that a given robot of the plurality of robots deployed at block 806 has arrived at the plant that is the target of the agricultural task assigned to the given robot, at block 810, the system may cause a manual control GUI to be rendered on a client device 106. As was the case previously, the manual control GUI may be operable by a human operator to manually control the given robot to perform the agricultural task assigned to the given robot. In some implementations, the manual control GUI may not be provided immediately, but instead may be made available to the human operator, e.g., as a tile or icon that is selectable to launch the manual operation GUI.

Figure 9:
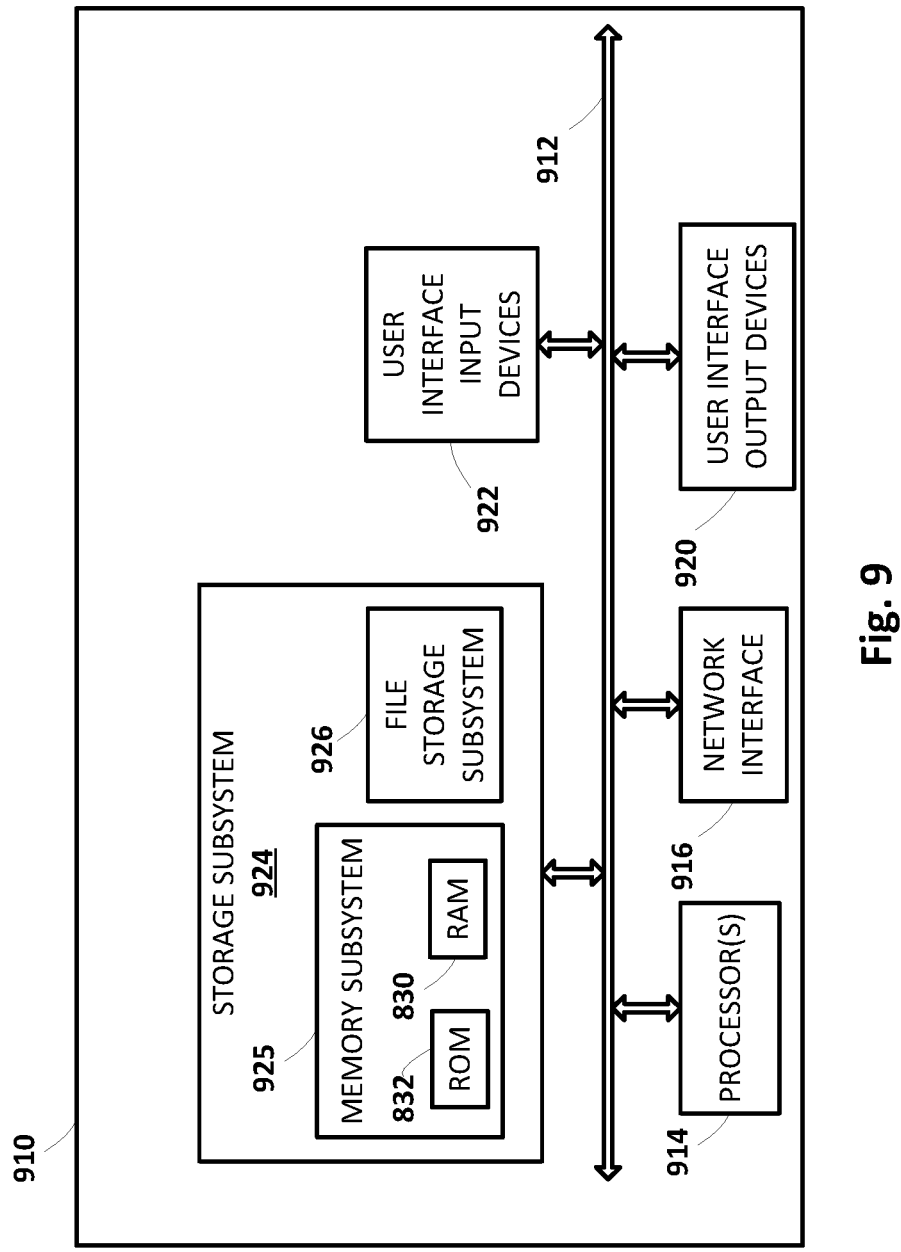
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 910 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method described herein, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
deploying a plurality of robots to perform a respective plurality of agricultural tasks, wherein each agricultural task of the plurality of agricultural tasks is associated with a respective plant of a plurality of plants, wherein each plant of the plurality of plants was previously designated as a target for one of the agricultural tasks;
for each agricultural task of the plurality of agricultural tasks, calculating a measure of robot performability that represents a likelihood that the respective robot of the plurality of robots assigned to the agricultural task will be able to perform the agricultural task successfully;
causing a graphical user interface (GUI) to be rendered on a display, wherein the GUI includes a plurality of selectable elements corresponding to the plurality of agricultural tasks, and wherein each of the selectable elements is selectable to influence performance of the corresponding agricultural task by the respective robot of the plurality of robots assigned to the agricultural task; and
causing a given selectable element of the plurality of selectable elements to be rendered to convey an indication of the measure of robot performability calculated for the agricultural task represented by the given selectable element.

2. The method of claim 1, further comprising:
determining that a given robot of the plurality of robots has autonomously reached the individual plant of the plurality of plants that is associated with the respective agricultural task of the plurality of agricultural tasks that was assigned to the given robot; and
in response to the determining, causing the selectable element representing the respective agricultural task to convey a status for the given robot assigned to the respective agricultural task, wherein the status comprises awaiting manual control or performing the respective agricultural task.

3. The method of claim 2, further comprising:
in response to selection of the selectable element representing the respective agricultural task, causing the GUI to render a manual control interface that is operable to manually control the given robot to perform the respective agricultural task;
receiving user input at the manual control interface; and
operating the given robot in accordance with the user input received at the manual control interface.

4. The method of claim 1, further comprising causing the given selectable element to be rendered with a previously-acquired image of the plant targeted by the agricultural task represented by the given selectable element.

5. The method of claim 4, wherein the previously-acquired image is annotated to identify one or more plant-parts-of-interest to be acted upon by the robot assigned to the agricultural task represented by the given selectable element.

6. The method of claim 5, wherein the given selectable element is selectable to asynchronously predefine a robot plan to be implemented by the robot assigned to the agricultural task represented by the given selectable element.

7. The method of claim 6, further comprising generating a trajectory of an end effector of the robot assigned to the agricultural task represented by the given selectable element, wherein the generating is based on interaction at the GUI with the annotated plant-parts-of-interest of the previously-acquired image.

8. A system comprising one or more processors and memory storing instructions that, in response to execution of the instructions, cause the one or more processors to:
deploy a plurality of robots to perform a respective plurality of agricultural tasks, wherein each agricultural task of the plurality of agricultural tasks is associated with a respective plant of a plurality of plants, wherein each plant of the plurality of plants was previously designated as a target for one of the agricultural tasks;
for each agricultural task of the plurality of agricultural tasks, calculate a measure of robot performability that represents a likelihood that the respective robot of the plurality of robots assigned to the agricultural task will be able to perform the agricultural task successfully;
cause a graphical user interface (GUI) to be rendered on a display, wherein the GUI includes a plurality of selectable elements corresponding to the plurality of agricultural tasks, and wherein each of the selectable elements is selectable to influence performance of the corresponding agricultural task by the respective robot of the plurality of robots assigned to the agricultural task; and
cause a given selectable element of the plurality of selectable elements to be rendered to convey an indication of the measure of robot performability calculated for the agricultural task represented by the given selectable element.

9. The system of claim 8, further comprising instructions to:
determine that a given robot of the plurality of robots has autonomously reached the individual plant of the plurality of plants that is associated with the respective agricultural task of the plurality of agricultural tasks that was assigned to the given robot; and
in response to the determination that the given robot has autonomously reached the individual plant, cause the selectable element representing the respective agricultural task to convey a status for the given robot assigned to the respective agricultural task, wherein the status comprises awaiting manual control or performing the respective agricultural task.

10. The system of claim 9, further comprising instructions to:
in response to selection of the selectable element representing the respective agricultural task, cause the GUI to render a manual control interface that is operable to manually control the given robot to perform the respective agricultural task;
receive user input at the manual control interface; and
operate the given robot in accordance with the user input received at the manual control interface.

11. The system of claim 8, further comprising instructions to cause the given selectable element to be rendered with a previously-acquired image of the plant targeted by the agricultural task represented by the given selectable element.

12. The system of claim 11, wherein the previously-acquired image is annotated to identify one or more plant-parts-of-interest to be acted upon by the robot assigned to the agricultural task represented by the given selectable element.

13. The system of claim 12, wherein the given selectable element is selectable to asynchronously predefine a robot plan to be implemented by the robot assigned to the agricultural task represented by the given selectable element.

14. The system of claim 13, further comprising instructions to generate a trajectory of an end effector of the robot assigned to the agricultural task represented by the given selectable element, wherein the trajectory is generated based on interaction at the GUI with the annotated plant-parts-of-interest of the previously-acquired image.

15. A non-transitory computer-readable medium comprising instructions that, in response to execution of the instructions by a processor, cause the processor to:
deploy a plurality of robots to perform a respective plurality of agricultural tasks, wherein each agricultural task of the plurality of agricultural tasks is associated with a respective plant of a plurality of plants, wherein each plant of the plurality of plants was previously designated as a target for one of the agricultural tasks;
for each agricultural task of the plurality of agricultural tasks, calculate a measure of robot performability that represents a likelihood that the respective robot of the plurality of robots assigned to the agricultural task will be able to perform the agricultural task successfully;
cause a graphical user interface (GUI) to be rendered on a display, wherein the GUI includes a plurality of selectable elements corresponding to the plurality of agricultural tasks, and wherein each of the selectable elements is selectable to influence performance of the corresponding agricultural task by the respective robot of the plurality of robots assigned to the agricultural task; and
cause a given selectable element of the plurality of selectable elements to be rendered to convey an indication of the measure of robot performability calculated for the agricultural task represented by the given selectable element.

16. The non-transitory computer-readable medium of claim 15, further comprising instructions to:
determine that a given robot of the plurality of robots has autonomously reached the individual plant of the plurality of plants that is associated with the respective agricultural task of the plurality of agricultural tasks that was assigned to the given robot; and
in response to the determination that the given robot has autonomously reached the individual plant, cause the selectable element representing the respective agricultural task to convey a status for the given robot assigned to the respective agricultural task, wherein the status comprises awaiting manual control or performing the respective agricultural task.

17. The non-transitory computer-readable medium of claim 16, further comprising instructions to:
in response to selection of the selectable element representing the respective agricultural task, cause the GUI to render a manual control interface that is operable to manually control the given robot to perform the respective agricultural task;
receive user input at the manual control interface; and
operate the given robot in accordance with the user input received at the manual control interface.

18. The non-transitory computer-readable medium of claim 15, further comprising instructions to cause the given selectable element to be rendered with a previously-acquired image of the plant targeted by the agricultural task represented by the given selectable element.

19. The non-transitory computer-readable medium of claim 18, wherein the previously-acquired image is annotated to identify one or more plant-parts-of-interest to be acted upon by the robot assigned to the agricultural task represented by the given selectable element.

20. The non-transitory computer-readable medium of claim 19, wherein the given selectable element is selectable to asynchronously predefine a robot plan to be implemented by the robot assigned to the agricultural task represented by the given selectable element.

* * * * *